(12) United States Patent
Lei et al.

(10) Patent No.: US 11,224,077 B2
(45) Date of Patent: Jan. 11, 2022

(54) POSITIONING ASSISTED RESOURCE CONFIGURATION AND SELECTION FOR TWO-STEP RANDOM ACCESS CHANNEL PROCEDURE

(71) Applicant: QUALCOMM Incorporated, San Diego, CA (US)

(72) Inventors: Jing Lei, San Diego, CA (US); Wanshi Chen, San Diego, CA (US); Seyong Park, San Diego, CA (US); Alexandros Manolakos, San Diego, CA (US); Joseph Binamira Soriaga, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/922,710

(22) Filed: Jul. 7, 2020

(65) Prior Publication Data

US 2021/0014900 A1    Jan. 14, 2021

(30) Foreign Application Priority Data

Jul. 9, 2019  (GR) .............................. 20190100289

(51) Int. Cl.
*H04W 74/08*   (2009.01)
*H04W 64/00*   (2009.01)
(52) U.S. Cl.
CPC ..... *H04W 74/0833* (2013.01); *H04W 64/006* (2013.01)
(58) Field of Classification Search
CPC ........... H04W 74/0833; H04W 72/042; H04W 76/27; H04W 72/0413; H04W 92/18;
(Continued)

(56) References Cited

U.S. PATENT DOCUMENTS

2012/0155310 A1*  6/2012  Kreuzer .............. H04W 52/262
                                                                  370/252
2018/0152904 A1*  5/2018  Xirouchakis ....... H04W 74/085
(Continued)

FOREIGN PATENT DOCUMENTS

WO    2018171524 A1    9/2018
WO    2018230205 A1   12/2018
WO    2019096679 A1    5/2019

OTHER PUBLICATIONS

Intel Corporation: "Channel structure for 2-step RACH", 3GPP Draft, 3GPP TSG RAN WG1 #96bis, R1-1904280 Intel Channel Structure, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051699596, 11 pages, Retrieved from the Internet: URL: http://www.3gpp.org/ftp/Meetings%5F3GPP%5FSYNC/RAN1/Docs/R1%2D1904280%2Ezip. [retrieved on Apr. 7, 2019] Section 1. last.

(Continued)

*Primary Examiner* — Kwasi Karikari
(74) *Attorney, Agent, or Firm* — Qualcomm Incorporated

(57) ABSTRACT

In an aspect, a user equipment (UE) determines a resource configuration and a transmit power for a physical random access channel (PRACH) preamble sequence and/or a configuration and a transmit power for a physical uplink shared channel (PUSCH) resource unit (PRU) based on positioning information of the UE relative to the base station, the speed of the UE relative to the base station, and/or a radio resource control (RRC) state of the UE, transmits, to the base station, a message comprising the PRACH preamble sequence on a PRACH occasion and a payload on a PRU occasion based on the determined resource configuration and transmit power for the PRACH preamble sequence and/or the determined resource configuration and transmit power for the (Continued)

PRU, and receives, from the base station, a second message comprising information on a physical downlink control channel (PDCCH) and a payload on a physical downlink shared channel (PDSCH).

30 Claims, 17 Drawing Sheets

(58) Field of Classification Search
CPC ........... H04W 72/0446; H04W 52/146; H04W 72/0406; H04W 74/008; H04W 74/0808; H04W 56/001; H04W 72/1289; H04W 74/006; H04W 72/046; H04W 72/14; H04W 16/14; H04W 48/10; H04W 52/383; H04W 74/08; H04W 72/0473; H04W 72/1268; H04W 52/283; H04W 72/04; H04W 72/12; H04W 76/10
See application file for complete search history.

(56) References Cited

U.S. PATENT DOCUMENTS

| | | | |
|---|---|---|---|
| 2018/0219663 A1* | 8/2018 | Lin | H04W 74/0833 |
| 2020/0100301 A1 | 3/2020 | Kusashima et al. | |
| 2020/0245373 A1* | 7/2020 | Xiong | H04L 27/2613 |

OTHER PUBLICATIONS

International Search Report and Written Opinion—PCT/US2020/041205—ISA/EPO—dated Oct. 2, 2020.

* cited by examiner

POSITIONING ASSISTED RESOURCE CONFIGURATION AND SELECTION FOR TWO-STEP RANDOM ACCESS CHANNEL PROCEDURE

CROSS-REFERENCE TO RELATED APPLICATION

The present application for patent claims priority under 35 U.S.C. § 119 to Greek Patent Application No. 20190100289, entitled "POSITIONING ASSISTED RESOURCE CONFIGURATION FOR TWO-STEP RANDOM ACCESS CHANNEL PROCEDURE," filed Jul. 9, 2019, assigned to the assignee hereof, and expressly incorporated herein by reference in its entirety.

INTRODUCTION

1. Technical Field

Aspects of this disclosure relate generally to wireless communications and the like.

2. Background

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes obtaining one or more measurements for estimating a distance between the UE and a serving base station, one or more measurements for estimating a speed of the UE relative to the serving base station, or both; determining a resource configuration and a transmit power for a first physical random access channel (PRACH) preamble sequence and/or a resource configuration and a transmit power for a first physical uplink shared channel (PUSCH) resource unit (PRU) based at least on the distance between the UE and the serving base station, the speed of the UE relative to the serving base station, a radio resource control (RRC) state of the UE, or any combination thereof; transmitting, to the serving base station over a first carrier frequency, a first message comprising the first PRACH preamble sequence on a PRACH occasion and a first message payload on a PRU occasion based on the determined resource configuration and transmit power for the first PRACH preamble sequence and/or the determined resource configuration and transmit power for the first PRU; and receiving, from the serving base station over the first carrier frequency, a second message comprising information on a physical downlink control channel (PDCCH) and a second message payload on a physical downlink shared channel (PDSCH).

In an aspect, a method of wireless communication performed by a base station includes receiving, from a UE over a first carrier frequency, a first message comprising a first PRACH preamble sequence on a first PRACH occasion and a first message payload on a first PRU, wherein a resource configuration and a transmit power for the first PRACH preamble sequence, a configuration and a transmit power for the first PRU, or both is based at least on a distance between the UE and the base station, a speed of the UE relative to the base station, an RRC state of the UE, or any combination thereof; and transmitting, to the UE over the first carrier frequency, a second message comprising information on a PDCCH and a second message payload on a PDSCH.

In an aspect, a UE includes a memory; at least one transceiver; and at least one processor communicatively coupled to the memory and the at least one transceiver, the at least one processor configured to obtain one or more measurements for estimating a distance between the UE and a serving base station, one or more measurements for estimating a speed of the UE relative to the serving base station, or both; determine a resource configuration and a transmit power for a first PRACH preamble sequence and/or a resource configuration and a transmit power for a first PRU based at least on the distance between the UE and the serving base station, the speed of the UE relative to the serving base station, an RRC state of the UE, or any combination thereof, cause the at least one transceiver to transmit, to the serving base station over a first carrier frequency, a first message comprising the first PRACH preamble sequence on a PRACH occasion and a first message payload on a PRU occasion based on the determined resource configuration and transmit power for the first PRACH preamble sequence and/or the determined resource configuration and transmit power for the first PRU; and receive, from the serving base station over the first carrier frequency via the at least one transceiver, a second message comprising information on a PDCCH and a second message payload on a PDSCH.

In an aspect, a base station includes a memory; at least one transceiver; and at least one processor communicatively coupled to the memory and the at least one transceiver, the at least one processor configured to receive, from a UE over a first carrier frequency, a first message comprising a first PRACH preamble sequence on a first PRACH occasion and a first message payload on a first, wherein a resource configuration and a transmit power for the first PRACH preamble sequence, a configuration and a transmit power for the first PRU, or both is based at least on a distance between the UE and the base station, a speed of the UE relative to the base station, an RRC state of the UE, or any combination thereof; and cause the at least one transceiver to transmit, to the UE over the first carrier frequency, a second message comprising information on a PDCCH and a second message payload on a PDSCH.

In an aspect, a UE includes means for obtaining one or more measurements for estimating a distance between the UE and a serving base station, one or more measurements for estimating a speed of the UE relative to the serving base station, or both; means for determining a resource configuration and a transmit power for a first PRACH preamble sequence and/or a resource configuration and a transmit power for a first PRU based at least on the distance between the UE and the serving base station, the speed of the UE relative to the serving base station, an RRC state of the UE, or any combination thereof; means for transmitting, to the serving base station over a first carrier frequency, a first message comprising the first PRACH preamble sequence on a PRACH occasion and a first message payload on a PRU occasion based on the determined resource configuration and transmit power for the first PRACH preamble sequence and/or the determined resource configuration and transmit power for the first PRU; and means for receiving, from the serving base station over the first carrier frequency, a second message comprising information on a PDCCH and a second message payload on a PDSCH.

In an aspect, a base station includes means for receiving, from a UE over a first carrier frequency, a first message comprising a first PRACH preamble sequence on a first PRACH occasion and a first message payload on a first PRU, wherein a resource configuration and a transmit power for the first PRACH preamble sequence, a configuration and a transmit power for the first PRU, or both is based at least on a distance between the UE and the base station, a speed of the UE relative to the base station, a radio resource control (RRC) state of the UE, or any combination thereof; and means for transmitting, to the UE over the first carrier frequency, a second message comprising information on a PDCCH and a second message payload on a PDSCH.

In an aspect, a non-transitory computer-readable medium storing computer-executable instructions includes computer-executable instructions comprising at least one instruction instructing a UE to obtain one or more measurements for estimating a distance between the UE and a serving base station, one or more measurements for estimating a speed of the UE relative to the serving base station, or both; at least one instruction instructing the UE to determine a resource configuration and a transmit power for a first PRACH preamble sequence and/or a resource configuration and a transmit power for a first PRU based at least on the distance between the UE and the serving base station, the speed of the UE relative to the serving base station, an RRC state of the UE, or any combination thereof; at least one instruction instructing the UE to transmit, to the serving base station over a first carrier frequency, a first message comprising the first PRACH preamble sequence on a PRACH occasion and a first message payload on a PRU occasion based on the determined resource configuration and transmit power for the first PRACH preamble sequence and/or the determined resource configuration and transmit power for the first PRU; and at least one instruction instructing the UE to receive, from the serving base station over the first carrier frequency, a second message comprising information on a PDCCH and a second message payload on a PDSCH.

In an aspect, a non-transitory computer-readable medium storing computer-executable instructions includes computer-executable instructions comprising at least one instruction instructing a base station to receive, from a UE over a first carrier frequency, a first message comprising a first PRACH preamble sequence on a first PRACH occasion and a first message payload on a first PRU, wherein a resource configuration and a transmit power for the first PRACH preamble sequence, a configuration and a transmit power for the first PRU, or both is based at least on a distance between the UE and the base station, a speed of the UE relative to the base station, an RRC state of the UE, or any combination thereof; and at least one instruction instructing the base station to transmit, to the UE over the first carrier frequency, a second message comprising information on a PDCCH and a second message payload on a PDSCH.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
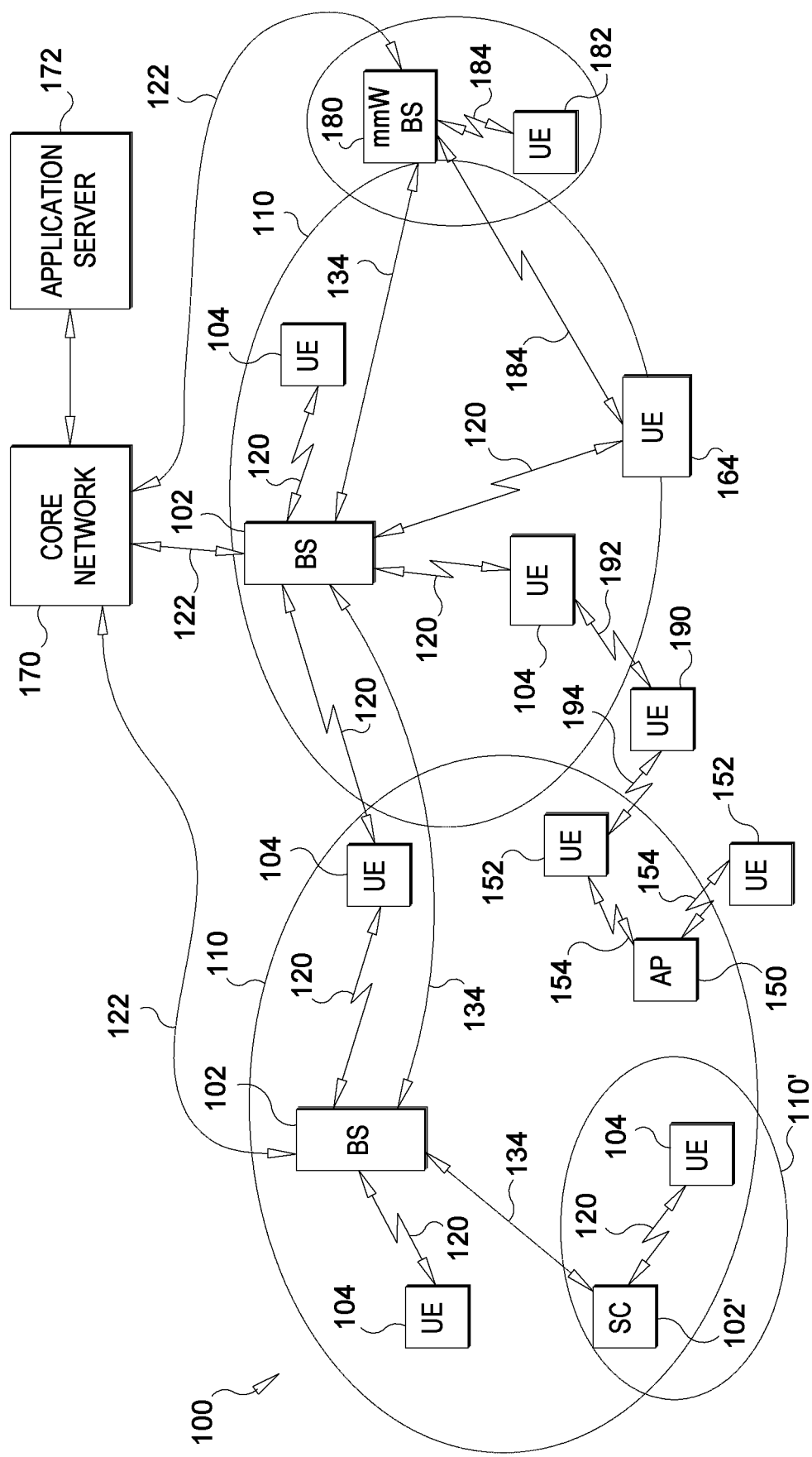
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
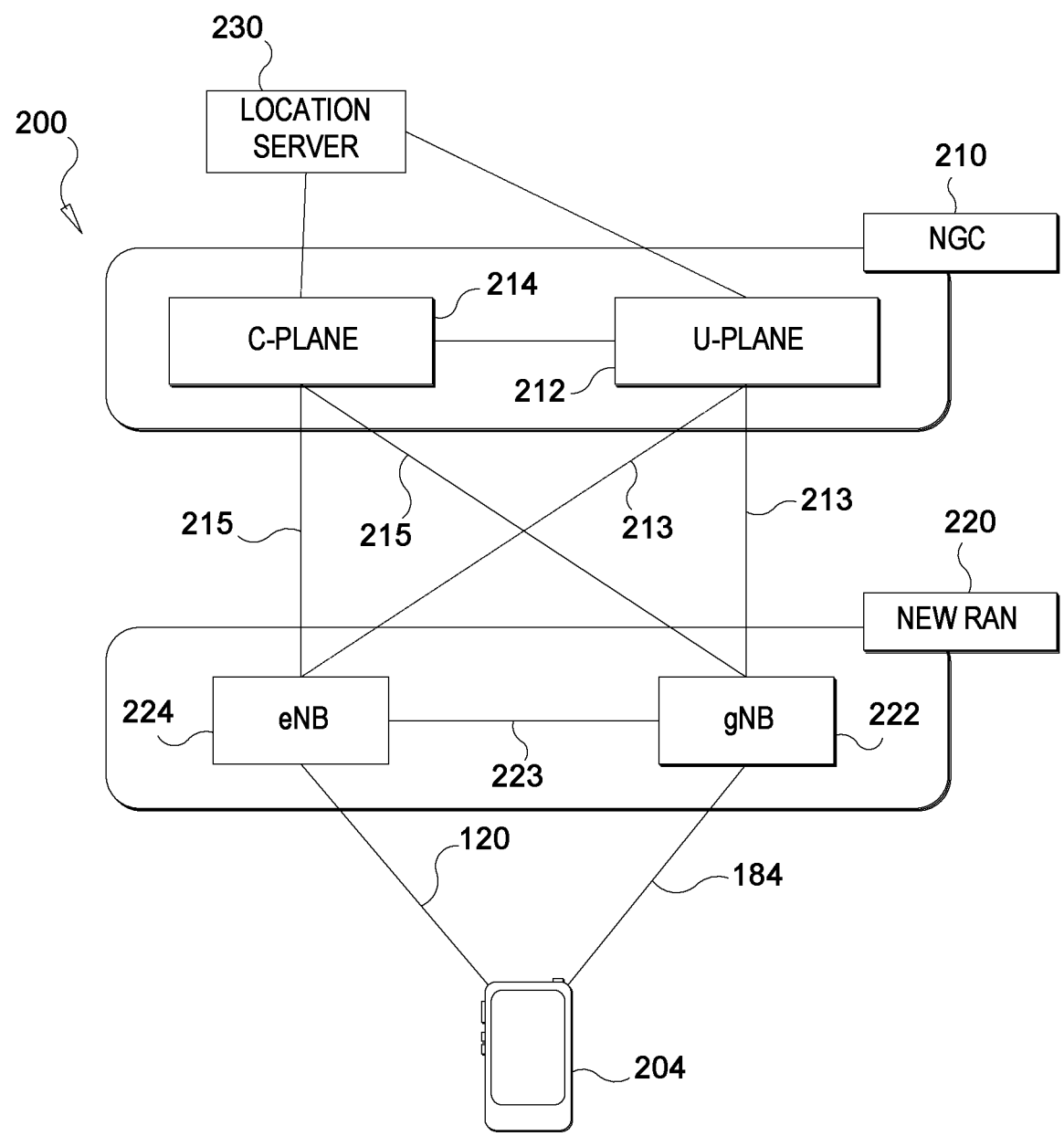
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
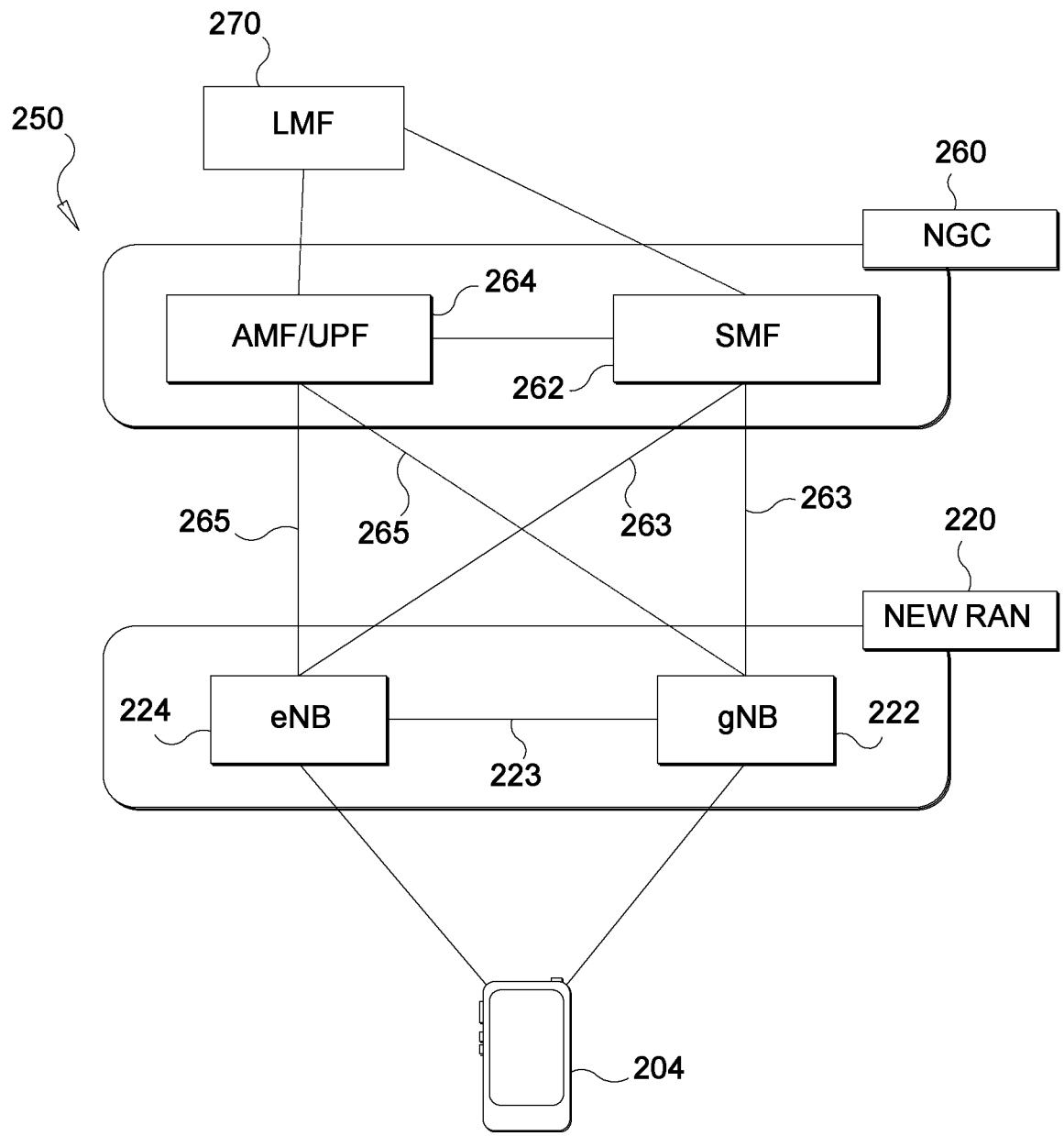

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
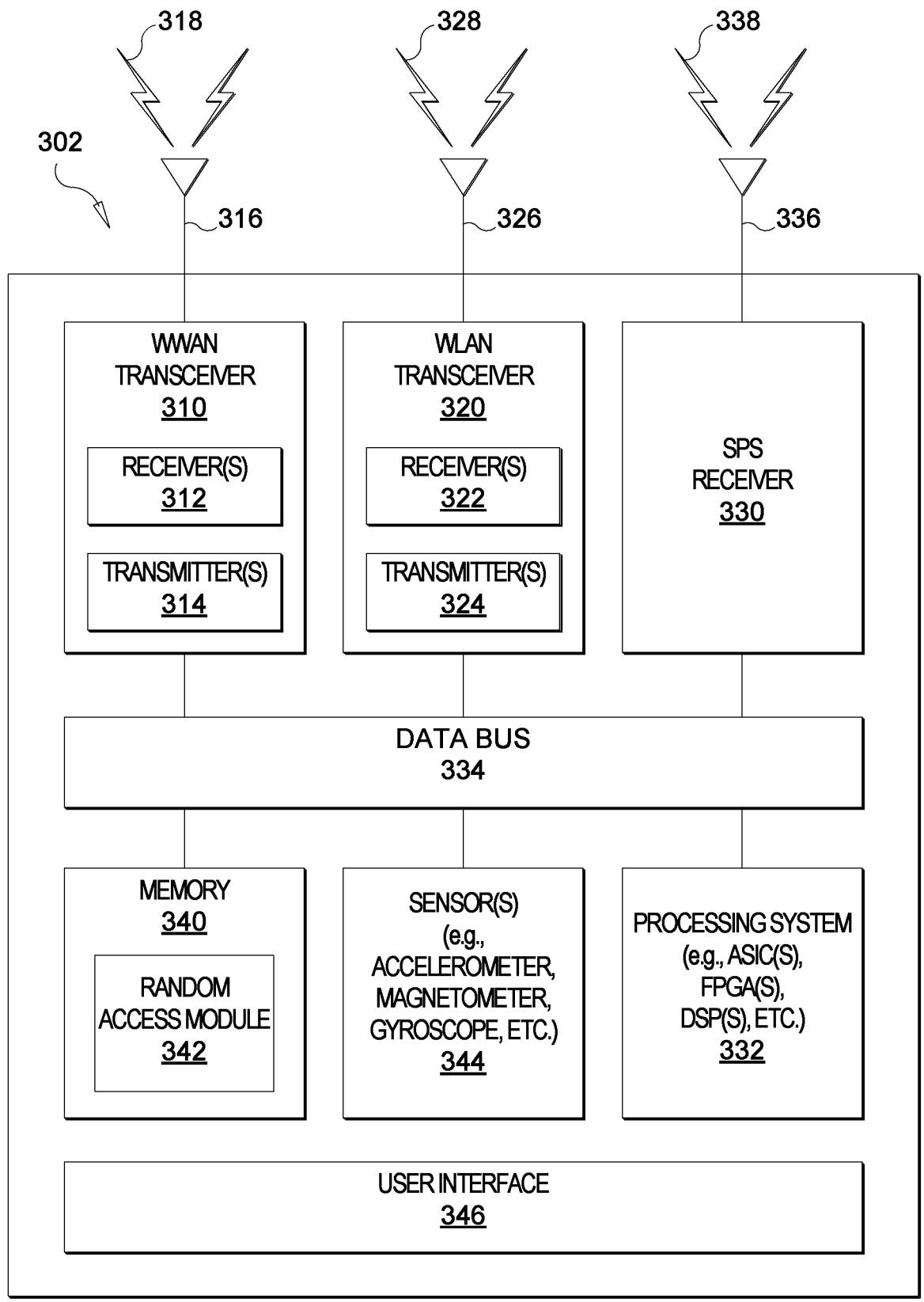
FIGS. 3A to 3C are simplified block diagrams of several sample aspects of components that may be employed in wireless communication nodes and configured to support communication as taught herein.
Figure 3B:
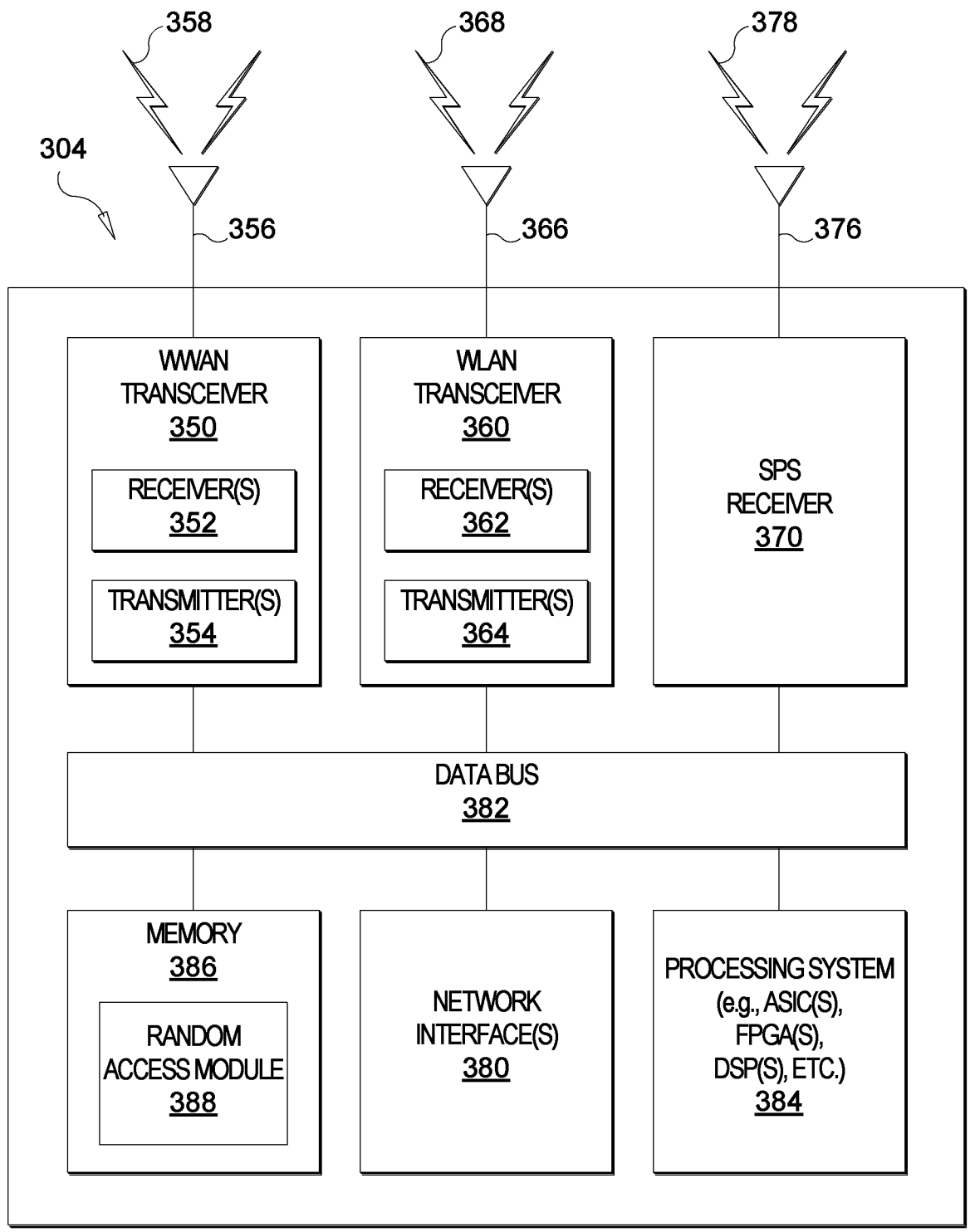
Figure 3C:
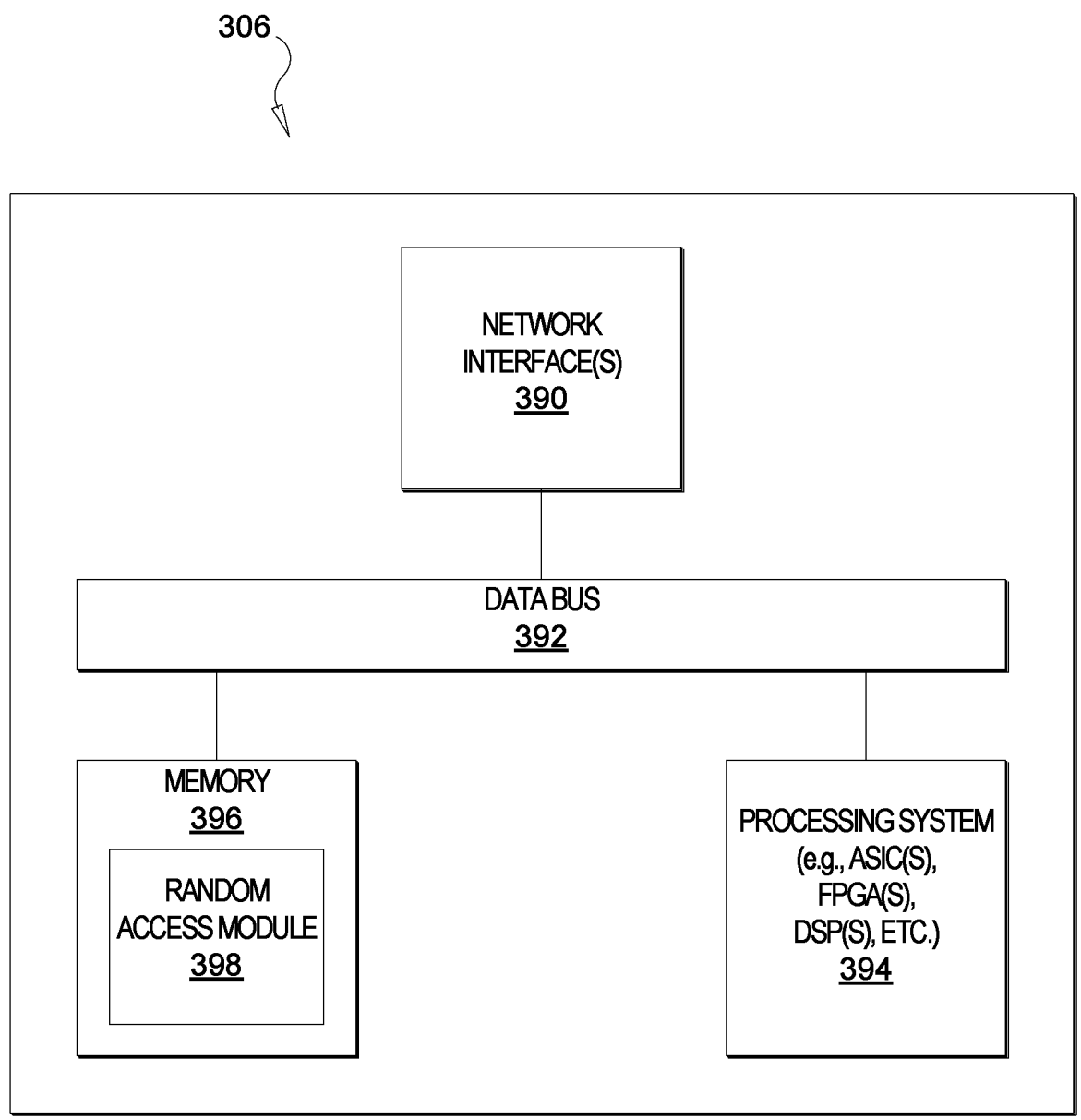

FIGS. 3A, 3B, and 3C illustrate several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 336, and 376), such as an antenna array, that permits the respective apparatus to perform transmit "beamforming," as described herein. Similarly, a receiver may include or be coupled to a plurality of antennas (e.g., antennas 316, 336, and 376), such as an antenna array, that permits the respective apparatus to perform receive beamforming, as described herein. In an aspect, the transmitter and receiver may share the same plurality of antennas (e.g., antennas 316, 336, and 376), such that the respective apparatus can only receive or transmit at a given time, not both at the same time. A wireless communication device (e.g., one or both of the transceivers 310 and 320 and/or 350 and 360) of the apparatuses 302 and/or 304 may also comprise a network listen module (NLM) or the like for performing various measurements.

The apparatuses 302 and 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine the apparatus' 302 and 304 positions using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving: messages, parameters, or other types of information.

The apparatuses 302, 304, and 306 also include other components that may be used in conjunction with the operations as disclosed herein. The UE 302 includes processor circuitry implementing a processing system 332 for providing functionality relating to, for example, random access procedures as disclosed herein and for providing other processing functionality. The base station 304 includes a processing system 384 for providing functionality relating to, for example, random access procedures as disclosed herein and for providing other processing functionality. The network entity 306 includes a processing system 394 for providing functionality relating to, for example, random access procedures as disclosed herein and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The apparatuses 302, 304, and 306 include memory circuitry implementing memory components 340, 386, and 396 (e.g., each including a memory device), respectively, for maintaining information (e.g., information indicative of reserved resources, thresholds, parameters, and so on). In some cases, the apparatuses 302, 304, and 306 may include random access modules 342, 388, and 398, respectively. The random access modules 342, 388, and 398 may be hardware circuits that are part of or coupled to the processing systems 332, 384, and 394, respectively, that, when executed, cause the apparatuses 302, 304, and 306 to perform the functionality described herein. In other aspects, the random access modules 342, 388, and 398 may be external to the processing systems 332, 384, and 394 (e.g., part of a modem processing system, integrated with another processing system, etc.). Alternatively, the random access modules 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the apparatuses 302, 304, and 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the apparatuses 302, 304, and/or 306 are shown in FIGS. 3A-C as including various components that may be configured according to the various examples described herein. It will be appreciated, however, that the illustrated blocks may have different functionality in different designs.

The various components of the apparatuses 302, 304, and 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the random access modules 342, 388, and 398, etc.

Figure 4A:
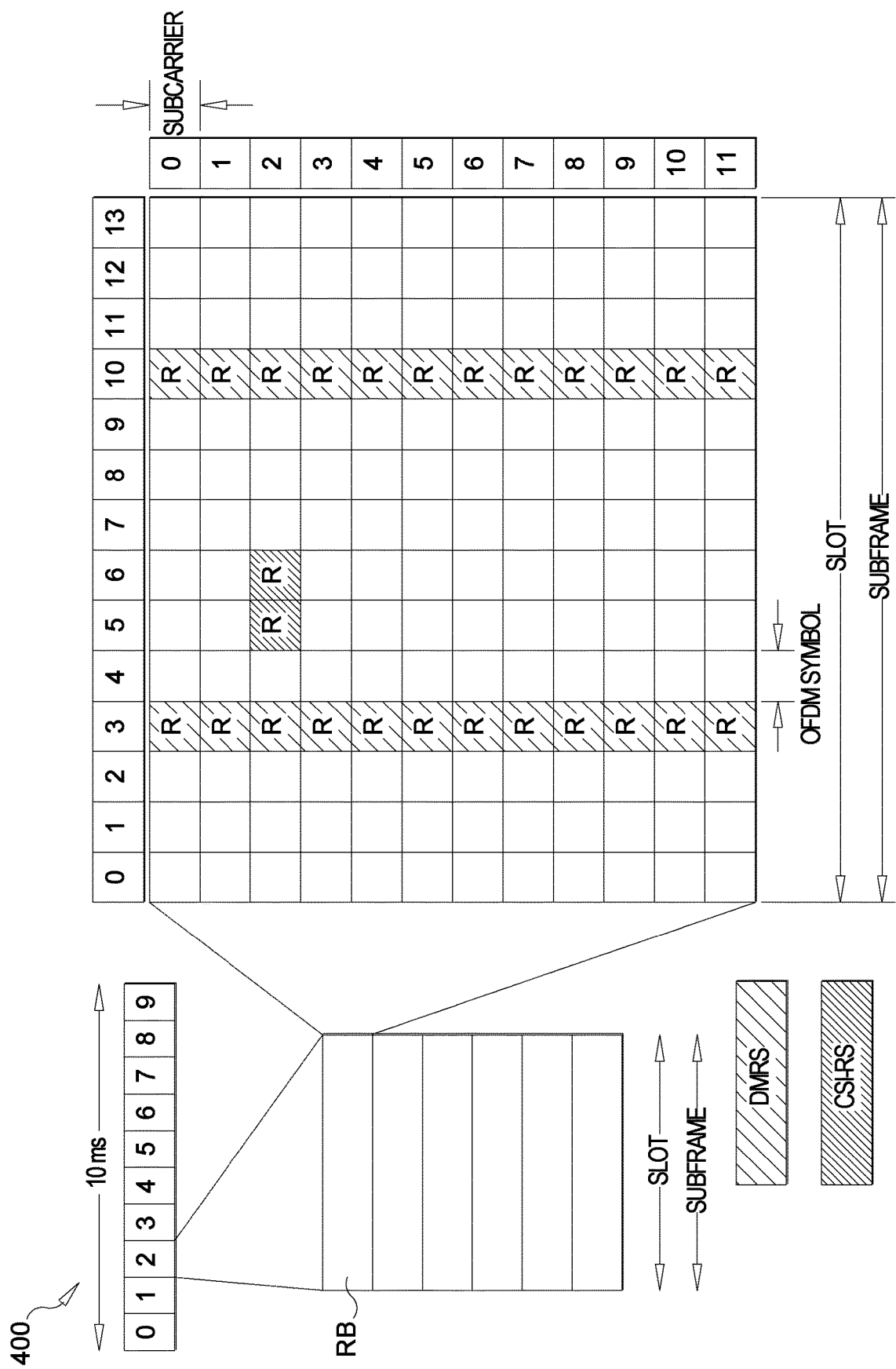
FIGS. 4A and 4B are diagrams illustrating examples of frame structures and channels within the frame structures, according to aspects of the disclosure.
Figure 4B:
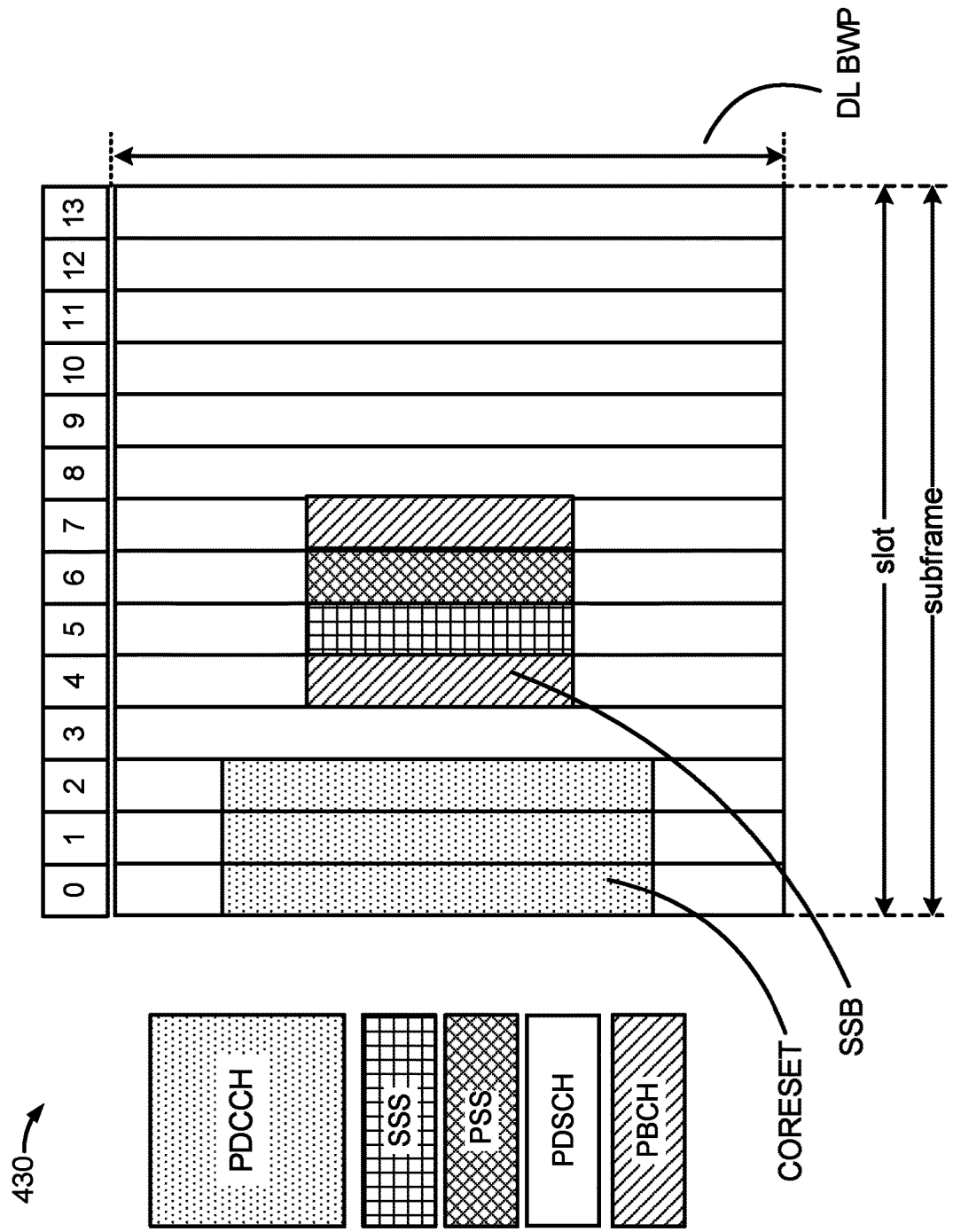

Time intervals of a communications resource in LTE or 5G NR may be organized according to radio frames. FIG. 4A is a diagram 400 illustrating an example of a downlink frame structure, according to aspects of the disclosure. FIG. 4B is a diagram 430 illustrating an example of channels within the downlink frame structure, according to aspects of the disclosure. Other wireless communications technologies may have a different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast NR may support multiple numerologies, for example, subcarrier spacing of 15 kHz, 30 kHz, 60 kHz, 120 kHz, and 240 kHz or greater may be available. Table 1 provided below lists some various parameters for different NR numerologies.

TABLE 1

| Subcarrier spacing (kHz) | Symbols/ slot | slots/ subframe | slots/ frame | slot (ms) | Symbol duration (μs) | Max. nominal system BW (MHz) with 4K FFT size |
|---|---|---|---|---|---|---|
| 15 | 14 | 1 | 10 | 1 | 66.7 | 50 |
| 30 | 14 | 2 | 20 | 0.5 | 33.3 | 100 |
| 60 | 14 | 4 | 40 | 0.25 | 16.7 | 100 |
| 120 | 14 | 8 | 80 | 0.125 | 8.33 | 400 |
| 240 | 14 | 16 | 160 | 0.0625 | 4.17 | 800 | be implemented by processor and memory component(s) of the base station 304 (e.g., by execution of appropriate code In the examples of FIGS. 4A and 4B, a numerology of 15 kHz is used. Thus, in the time domain, a frame (e.g., 10 ms)

is divided into 10 equally sized subframes of 1 ms each, and each subframe includes one time slot. In FIGS. 4A and 4B, time is represented horizontally (e.g., on the X axis) with time increasing from left to right, while frequency is represented vertically (e.g., on the Y axis) with frequency increasing (or decreasing) from bottom to top.

A resource grid may be used to represent time slots, each time slot including one or more time concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and 7 consecutive symbols (for downlink, OFDM symbols; for uplink, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 4A, some of the REs carry downlink reference (pilot) signals (DL-RS) for channel estimation at the UE. The DL-RS may include demodulation reference signals (DMRS) and channel state information reference signals (CSI-RS), exemplary locations of which are labeled "R" in FIG. 4A.

FIG. 4B illustrates an example of various channels within a downlink subframe of a frame. In NR, the channel bandwidth, or system bandwidth, is divided into multiple bandwidth parts (BWPs). A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 consecutive REs (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Figure 5:
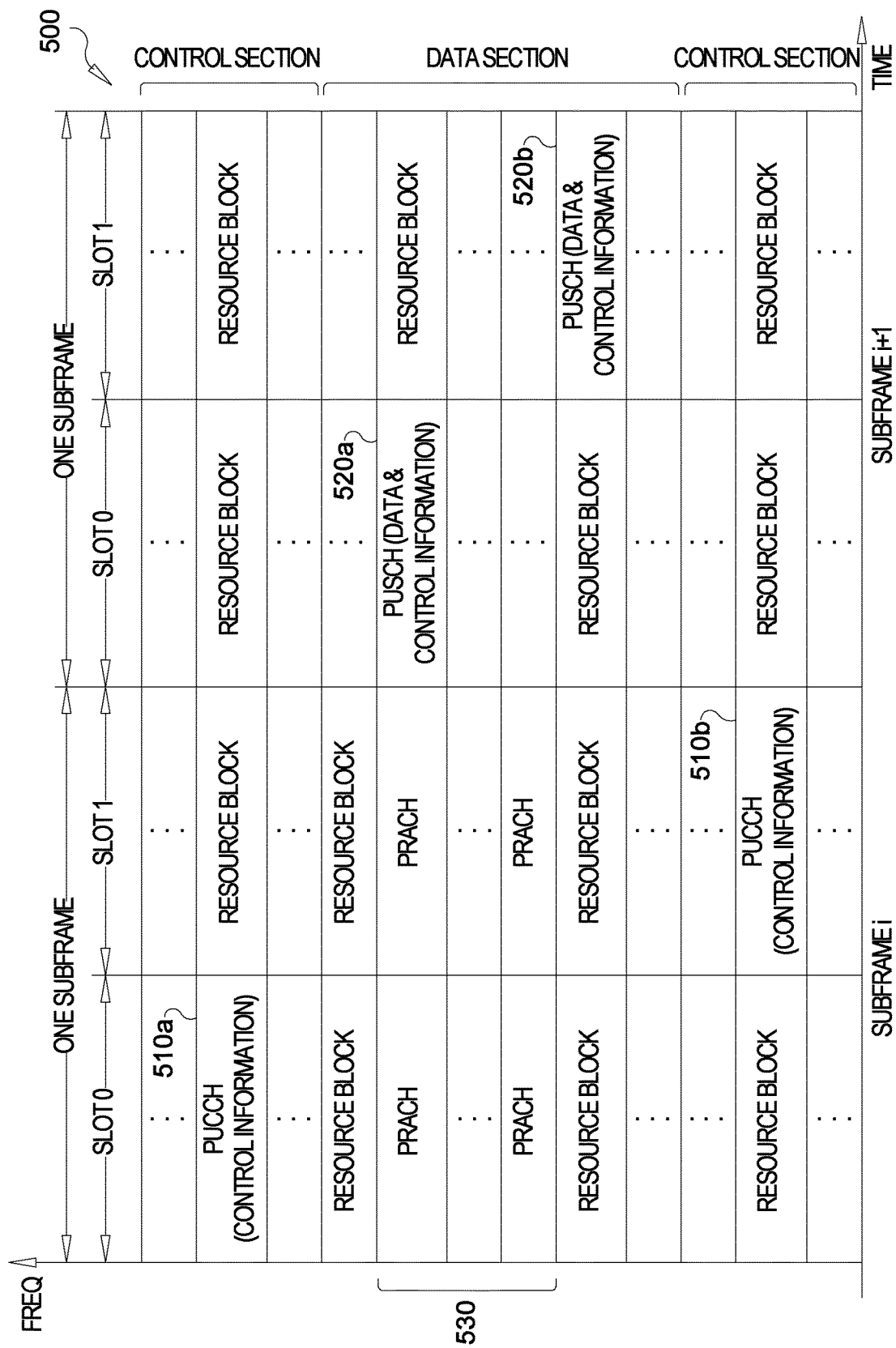
FIG. 5 illustrates an example of an uplink frame structure, according to aspects of the disclosure.

FIG. 5 illustrates an example of an uplink frame structure 500, according to aspects of the disclosure. FIG. 5 shows an exemplary format for the uplink in LTE, which may also be used in 5G NR. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510*a*, 510*b* in the control section to transmit control information to a base station (e.g., an eNodeB in LTE, a gNodeB in 5G NR). The UE may also be assigned resource blocks 520*a*, 520*b* in the data section to transmit data to the base station. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency as shown in FIG. 5.

As shown in FIG. 5, a set of resource blocks may be used to perform initial system access and achieve uplink synchronization in a physical random access channel (PRACH) 530. As discussed further below, the PRACH 530 carries a random sequence and does not carry any uplink data/signaling. Each random access preamble (also referred to as a "RACH preamble," "PRACH preamble," or simply "preamble") may occupy a bandwidth corresponding to six consecutive resource blocks. The starting frequency is specified by the network. That is, the transmission of the random access preamble is restricted to certain time and frequency resources. There is no frequency hopping for the PRACH. The PRACH attempt may be carried in a single subframe (1 ms) and a UE may make only a single PRACH attempt per frame (10 ms). Note that although FIG. 5 illustrates an uplink subframe comprising two slots (e.g., 0.5 ms each), as will be appreciated, this is merely an example, and a slot may be commensurate with a subframe, as illustrated in FIGS. 4A and 4B, depending on the numerology.

In wireless communication systems (e.g., wireless communications system 100), an important precondition for communication between a transmitter and a receiver is to establish the timing synchronization between the transmitter and the receiver. In NR, downlink synchronization is achieved by the base station periodically broadcasting SSBs and the UE aligning its local time to the network time indicated by the SSBs. Uplink synchronization, to ensure that the uplink signals from the UE to the base station are aligned with a common network time, is achieved using a random access procedure. A random access procedure can be triggered by an initial access to the network, a handover from one cell/base station to another, an RRC connection re-establishment, an uplink re-synchronization or SCell time alignment, a request for other system information (SI), or a beam failure recovery, for example.

Figure 6:
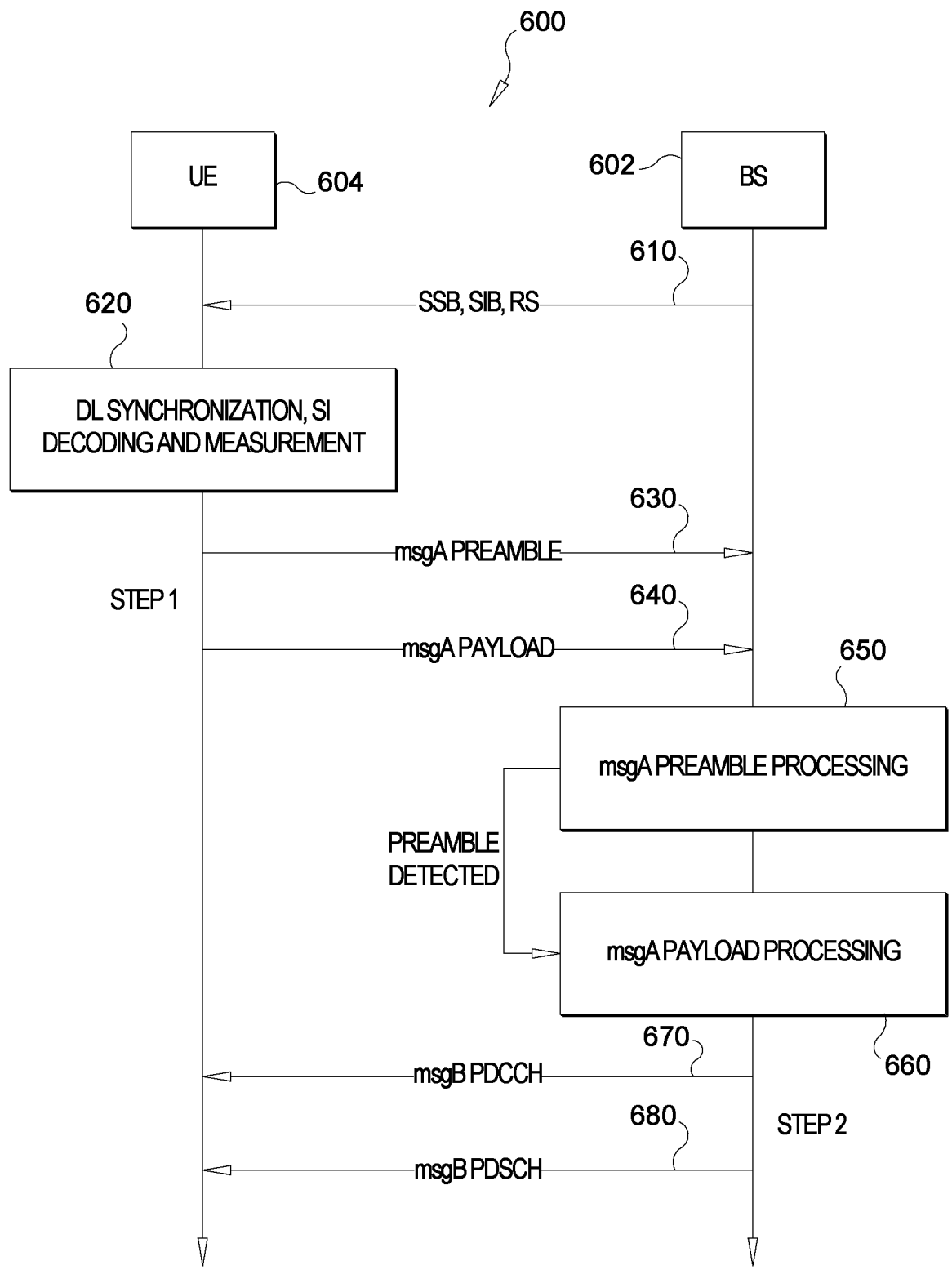
FIG. 6 illustrates an exemplary two-step random access procedure, according to aspects of the disclosure.

During a random access procedure, a UE and a base station may employ a two-step, as opposed to a conventional four-step, communication process. FIG. 6 illustrates an exemplary two-step random access procedure 600, according to aspects of the disclosure. In the example of FIG. 6, a UE 604 (which may correspond to any of the UEs described herein) is shown communicating with a serving base station 602 (which may correspond to any of the base stations described herein).

At 610, before the two-step random access procedure begins, the serving base station 602 broadcasts, and the UE 604 receives, periodic SSBs, SIBs, and reference signals. The system information (SI) in the SIBs includes configuration information for performing the two-step random access procedure 600. Specifically, the configuration information may include the pre-configured transmission parameters for the first message and second message of the two-step random access procedure 600, referred to as "message A" or "msgA" and "message B" or "msgB," respectively, such as the base sequences of msgA preambles (the random access preamble carried in the msgA), the number and locations of DMRS symbols within PUSCH resource units (PRUs), and the power control parameters for transmitting msgA preambles and PRUs. The configuration information may also include the pre-configured time/frequency/space/code resources used for msgA preambles and PRUs, the pre-configured reference signals used for positioning measurements, and the pre-configured rules (e.g., thresholds on positioning-related measurements) for a UE to select the appropriate transmission parameters and resources to transmit msgA preambles and PRUs.

At 620, the UE 604 performs downlink synchronization with the base station 602 based on the received reference signal(s) and SSB(s) and decodes the system information in the SIB(s). The UE may also perform various measurements of these signals.

At 630, the UE 604 sends a msgA preamble and, at 640, a msgA payload, on the PRACH. The msgA preamble is randomly selected from a set of available PRACH preamble sequences. More specifically, in NR, a preamble sequence is based on a Zadoff Chu sequence. A Zadoff-Chu sequence is generated, then cyclic shifted, then spread over the frequency domain. Preamble sequences may have different formats depending on, for example, the subcarrier spacing of the preamble. For example, when the subcarrier spacing of the PRACH preamble is 1.25 or 5 kHz, a long sequence (e.g., length of 839) is used, and when the subcarrier spacing of the PRACH preamble is 15, 30, 60, or 120 kHz, a short sequence (e.g., length of 139) is used.

The msgA payload may include an identity of the UE 604, a channel flag, a buffer status report (BSR), a scheduling request (SR), user plane data, a MAC control element (MAC-CE), uplink control information (UCI) piggyback information, and/or other information. Although illustrated as being sent separately, as will be appreciated, the msgA preamble and msgA payload may be sent together as the preamble and payload of the same message, referred to collectively as the "msgA." In an aspect, the UE 604 may transmit the msgA at increasing power until the base station 602 detects the preamble.

When the serving base station 602 receives the msgA, the base station 602 detects the preamble at 650 and decodes the message payload at 660. In response to successfully detecting the preamble and decoding the payload at 650 and 660, the base station 602 sends the second message of the two-step random access procedure 600, i.e., the "msgB," to the UE 604. The msgB includes a transmission on the PDCCH (at 670) and a transmission on the PDSCH (at 680). The portion of the msgB transmitted on the PDCCH may include cyclic redundancy check (CRC) bits that are scrambled with a UE-specific network identifier (e.g., a radio network temporary identity (RNTI)). The portion of the msgB transmitted on the PDSCH may include UE-specific content, such as an indication confirming the PRACH preamble, a timing advance (TA) value, a back-off indicator, a contention resolution message, a transmit power control (TPC) command, an uplink or downlink resource grant, and/or other information.

On receipt of the msgB, the UE 604 attempts to decode the PDCCH and the message on the PDSCH. If the UE 604 successfully decodes both the PDCCH and the message on the PDSCH, then the UE 604 can send an acknowledgment (ACK) to the serving base station 602. If the UE 604 fails to decode the PDCCH, then the UE 604 can operate as if the msgA was not successfully received by the serving base station 602, and can retransmit the msgA with power ramping and/or random timing. On the other hand, if the UE 604 successfully decodes the PDCCH, but does not successfully decode the message on the PDSCH, then the UE 604 can transmit a negative acknowledgment (NACK) to the serving base station 602, which can cause the base station 602 to retransmit the message on the PDSCH.

A random access procedure, as illustrated in FIG. 6, may be a contention-free random access (CFRA) procedure or a contention-based random access (CBRA) procedure. When a UE (e.g., UE 604) transmit a PRACH preamble (e.g., msgA preamble in FIG. 6), it transmits a specific sequence, sometimes called a "signature." In each cell, there may be a total of 64 preamble sequences available and the UE randomly selects one of these sequences. As such, it is possible that multiple UEs will select the same sequence, and those sequences will reach the base station at the same time. This type of PRACH collision is referred to as "contention," and the corresponding random access procedure is referred to as a CBRA procedure. When CBRA procedures are used, the base station needs to resolve any such contentions through a contention resolution process.

In some cases, contentions are not acceptable and are prevented by the base station informing each UE of the preamble sequence it is to use. This type of RACH procedure is referred to as a CFRA procedure. To initiate a CFRA procedure, the UE should be in an RRC_CONNECTED mode before the random access procedure, as in the case of a handover.

Figure 7:
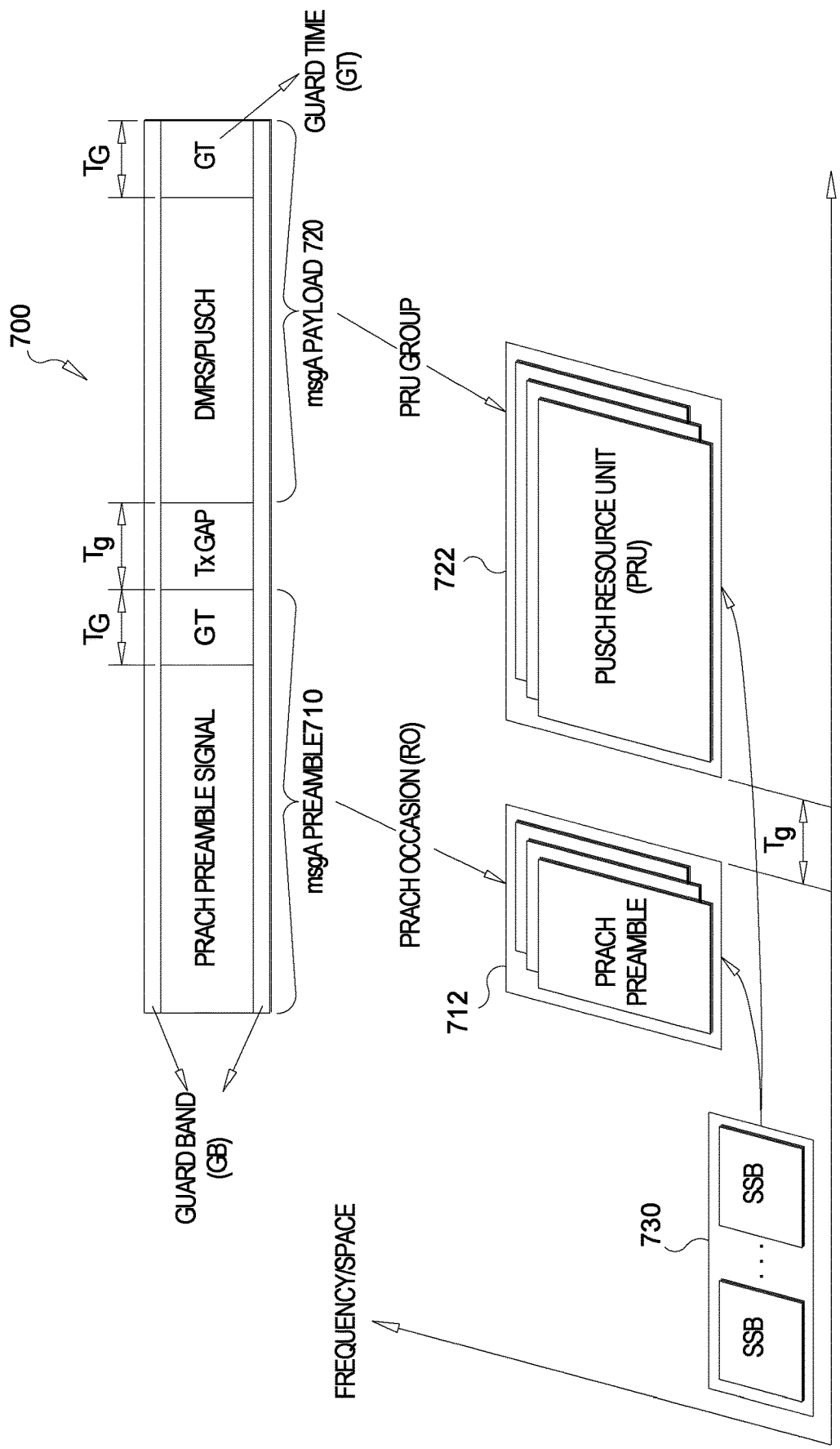
FIG. 7 illustrates an exemplary resource mapping for a msgA, according to aspects of the disclosure.

FIG. 7 illustrates an exemplary resource mapping for a msgA 700, according to aspects of the disclosure. As shown in FIG. 7, the msgA 700 includes a preamble 710 and a payload 720. In the frequency domain, there is a guard band (GB) above and below the frequency on which the msgA 700 is transmitted. In addition, in the time domain, there is a guard time (GT) following the preamble 710 and the payload 720, and a transmission gap (TxGap) between the preamble 710 and the payload 720.

The preamble 710 is mapped to one of multiple RACH occasions (ROs) 712. An RO is an area specified in the time and frequency domains that is available for the transmission/reception of the msgA preamble 710. In LTE, there is only one RO specified for all the possible PRACH preambles, but in NR, each synchronization signal (i.e., SSB 730) is associated with a different transmit beam, and the UE selects a certain transmit beam and then sends the msgA for that beam. In order for the base station to determine which beam the UE has selected, there is a specific mapping between the SSBs 730 and the ROs 712. By detecting on which RO 712 the UE sends the msgA, the base station can determine which transmit beam the UE has selected.

Similarly, the payload 720 is mapped to one of multiple PRUs 722. Like ROs 712, a PRU 722 is an area specified in the time and frequency domains that is available for the transmission/reception of the msgA payload 720. There is a specific mapping between the SSBs 730 and the PRUs 722. The UE sends the payload 720 on the PRU 722 mapped to the SSB 730 corresponding to the RO 712 of the msgA preamble 710. The PRU 722 includes both the uplink data channel, i.e., the PUSCH, and the uplink demodulation reference signal used to perform channel estimation and coherent demodulation of the uplink data channel, i.e., the DMRS.

The two-step random access procedure can be employed by premium UEs (UEs with higher capabilities, such as higher bandwidth utilization capabilities, higher transmission power capabilities, faster processing capabilities, etc.) and low-tier UEs (UEs with lower capabilities, such as lower bandwidth utilization capabilities, lower transmission power capabilities, slower processing capabilities, etc.) to reduce the signaling overhead and latency of small data transfers. The present disclosure provides techniques for using positioning information in conjunction with the two-step random access procedure to support flexible resource configurations for both contention-based and contention-free random access.

In CBRA two-step random access, msgA transmission is grant free. That is, the UE does not receive a resource grant on which to transmit the msgA. Instead, based on the received network configurations (e.g., as received at 610 of FIG. 6), downlink measurements/positioning-related information (e.g., localization, UE velocity, etc.), and the QoS class of the msgA, different UEs can choose different resource configuration for the msgA in CBRA mode to improve the resource utilization efficiency and reduce the multi-user interface (MUI) (which results from non-orthogonal multiple access). In CFRA two-step random access, msgA transmission is scheduled. Based on positioning-related information (e.g., localization, UE velocity) about the UE, the base station can schedule one or multiple UEs with the same or different resource configurations. The techniques of the present disclosure can use positioning-related information to assist msgA resource configuration and/or selection for two-step random access procedures.

In an aspect, positioning-related information can be obtained and utilized for two-step random access procedures. When performing a two-step random access procedure, both the UE and the base station can collect positioning-related information before the start of msgA transmission/retransmission. The positioning information may include at least measurements (e.g., signal strength, time of arrival, etc.) of DL/UL reference signals and/or reports in the MAC-CE. On the downlink, for example, this may include measurements of the SSB, SIB, CSI-RS, positioning reference signals (PRS), etc. On the uplink, for example, this may include measurements of SRS and/or positioning report in the MAC-CE. Such positioning-related information is available to the UE when in any RRC state.

Based on the knowledge of the positioning-related information, the UE or the base station can estimate the round-trip time (and therefore the distance) between the UE and the base station, the velocity of UE, and/or the like, as is known in the art. Alternatively or additionally, the UE or the base station may estimate the distance between the UE and the base station based on the signal strength (e.g., RSRP, RSRQ, SINR) of reference signals transmitted/received between the UE and the base station. As described further herein, such positioning-related information can assist the UE and/or the base station to improve the selection of the msgA preamble and the corresponding PRU resources. Examples of positioning-assisted resource configuration and/or selection for msgA can include msgA preamble formats appropriate for near/far UEs, msgA preamble sequences that are robust against high Doppler shift (for high-speed UEs), the number and/or location of DMRS symbols for near/far UEs and different UE speeds, time-frequency resource mapping of PRUs, transmit beam management for the msgA preamble and PRU, and/or the like.

The speed of a UE relative to the base station impacts the Doppler frequency shift and the time variation of the channel(s) between the UE and the base station. Thus, for high speed UEs, the PRUs can be configured with more DMRS symbols to track the variations of the channel(s). For stationary or low speed UEs, the PRUs can be configured with fewer DMRS symbols to reduce the overhead of performing channel estimation. Note that the "speed" of a UE relative to a base station should account for the change in the UE's distance from the base station. For example, a UE can move in a circle around a base station. In that case, the distance between the UE and the base station does not change, but the speed of the UE is not zero, and may even vary. Thus, as used herein, the speed of the UE is the amount that the UEs position moves closer to or further from the base station over time.

In an aspect, the UE or the base station can estimate variations of the distance between the UE and the serving base station and arrival-path-angles (i.e., angles of arrival) of reference signals received at the UE from the serving base station. Alternatively or additionally, the UE or the base station can estimate variations of the distance between the UE and the serving base station and arrival-path-angles of reference signals received at the UE from the neighbor base stations. Alternatively or additionally, the UE or the base station can estimate variations of the distance between the UE and the serving base station and arrival-path-angles of reference signals received at the UE from the multiple transmission points of the serving base station.

In an aspect, the present disclosure provides techniques for positioning-assisted preamble configuration and/or selection. Rather than a UE randomly selecting a PRACH preamble for the msgA preamble, the UE can select specific preambles depending on its distance from the base station and/or its current speed. In an aspect, a msgA PRACH preamble can be constructed by using one base sequence or multiple concatenated base sequences. For example, given base sequences X and Y, concatenated sequences could take the form of [X X Y Y], [X Y X Y], [Y X X Y], and the like. Base sequences should have a low peak to average power ratio (PAPR) and good auto-correlation/cross-correlation. For example, base sequences could be Zadoff-Chu sequences with prime length (a length that is a prime number), different combinations of root indexes, and cyclic shifts with respect to each other. Note that in some cases, a preamble sequence can be cyclic extended to fit into the "common" time/frequency resources configured for multiple preamble formats. For example, given a preamble sequence with prime length L of X=[x(1) x(2) ... x(L)], X can be cyclically extended into X'=[x(1) x(2) ... x(L) x(1) x(2) ... x(Q)] to fit into resources having dimension L+Q.

Because a msgA preamble is configured/selected based on distance and/or speed, multiple msgA preamble formats can be configured and employed in a single cell. For example, a first preamble format may have a base sequence length of $L_1$, a root index set $R_1$, a tone spacing $\Delta f_1$, a cyclic prefix (CP) length $N_1$, and cyclic shift size $N_{CS1}$. A second preamble format may have a base sequence length $L_2$, a root index set $R_2$, a tone spacing $\Delta f_2$, a CP length $N_2$, and a cyclic shift size $N_{CS2}$. A third preamble format may be a concatenation of multiple base sequences with length $L_3$, a root index set $R_3$, a tone spacing $\Delta f_3$, a CP length $N_3$, and cyclic shift size $N_{CS3}$.

Figure 8:
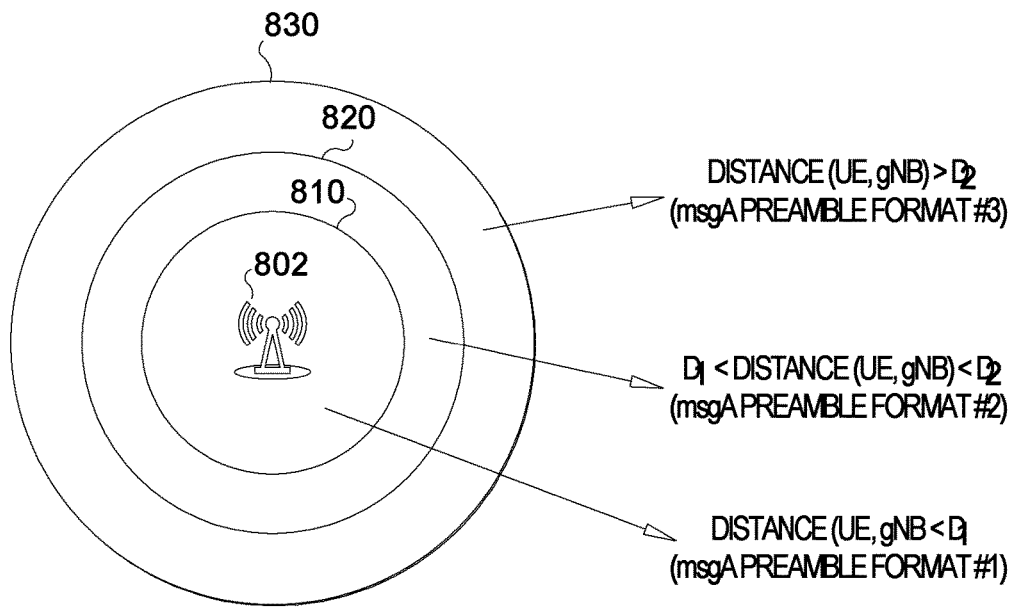
FIG. 8 illustrates different preamble formats for UEs in different cell ranges, according to aspects of the disclosure.

The network (e.g., the serving base station or a location server) may configure different preamble formats for UEs in different cell ranges and/or traveling with different speeds. For example, as illustrated in FIG. 8, for a range-based configuration, if the distance between a UE and a base station 802 is less than a first distance $D_1$ (i.e., within cell range 810), a first msgA preamble format may be used. For example, PRACH preamble format A1 with a tone spacing of 30 kHz and a cyclic shift size $N_{cs}$ of 13 can be used. If the distance between the UE and the base station 802 is greater than the first distance $D_1$ and less than a second distance $D_2$ (i.e., within cell range 820), a second msgA preamble format may be used. For example, PRACH preamble format B3 with a tone spacing of 30 kHz and a cyclic shift size $N_{cs}$ of 27 can be used. If the distance between the UE and the base station 802 is greater than the second distance $D_2$ (i.e., within cell range 830), a third msgA preamble format may be used. For example, PRACH preamble format 0 with a tone spacing of 1.25 kHz and a cyclic shift size $N_{cs}$ of 167 can be used. PRACH preamble formats A1, B3, and 0 are defined in Third Generation Partnership Project (3GPP) Technical Specification (TS) 38.211, which is publicly available, and which is incorporated by reference herein its entirety. For a Doppler-based configuration, for UEs traveling with high speed, for example, a subset of base sequences with better tolerance to Doppler shift can be configured for each format.

For contention-based two-step random access, the UE can obtain positioning-related information from multiple transmission points of the serving base station, or from the serving base station and neighboring cells, or from UE-centric machine learning and sidelink communications (e.g., P2P/D2D communication between UEs). The positioning information can be derived from the time(s) of arrival of reference signals from the base station (e.g., as in a round-trip-time procedure), reference signal time difference (RSTD) measurement(s) of reference signals from pairs of base stations, RSRP measurements of reference signals received from the base station, the angle of arrival and/or angle of departure of reference signals transmitted/received between the UE and the base station and/or other base stations/TRPs, and/or, for UEs in an RRC_CONNECTED or RRC_INACTIVE mode, from the latest timing advance (TA) parameter. Based on the network configuration (e.g., as received at 610 of FIG. 6) and the UE's knowledge of such positioning information, the UE can select an appropriate preamble format for msgA transmission.

Figure 9:
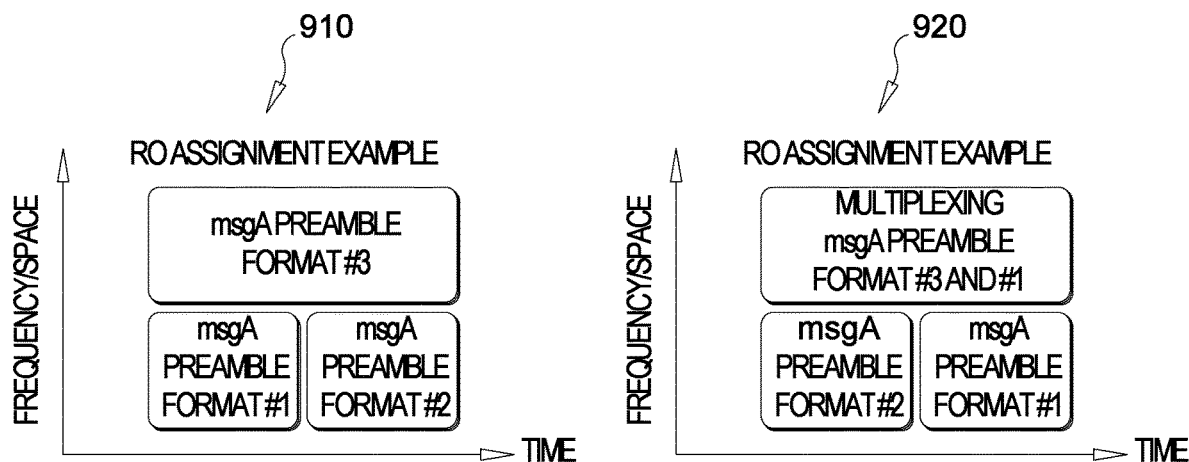
FIG. 9 illustrates different preamble formats multiplexed on the same PRACH occasion, according to aspects of the disclosure.

For contention-free two-step random access, the base station can obtain positioning-related information for the UE based on DL/UL measurements in the serving cell or neighboring cells. The base station can coordinate the msgA preamble format assignment in scheduling the msgA transmission. The base station can also schedule multiple UEs in the same RO, unlike conventional techniques, where only one UE can be scheduled in an RO. In addition, as illustrated in FIG. 9, different preamble formats can be multiplexed on the same RO (i.e., the same time/frequency resources), or assigned to different ROs. For example, as illustrated by graph 910, the first and second msgA preamble formats of FIG. 8 (i.e., formats "#1" and "#2") may occupy given time and frequency resources, and the third msgA preamble format of FIG. 8 (i.e., format "#3") may occupy higher frequency and longer time resources than the first and second msgA preamble formats. Further, as illustrated by graph 920, the first and third msgA preamble formats of FIG. 8 (i.e., formats "#1" and "#3") may be multiplexed over the time and frequency resources allocated for the third msgA preamble format in graph 910. Note that in some cases, where preamble formats are multiplexed across time/frequency resources, one or more of the preamble sequences can be cyclic extended (as described above) to fit into the time/frequency resources configured for the multiplexed preamble formats.

In an aspect, for a given preamble format, a base sequence with better tolerance to high Doppler shift can be configured by the base station and selected by a high-speed UE.

In an aspect, multiple PRACH preambles can be used in constructing msgA preambles for two-step random access procedures. More specifically, instead of using a fixed preamble format across the entire cell, multiple preamble formats can be used concurrently within one cell. For example, NR preamble format 0 and NR preamble format 3 (both NR preamble formats based on long Zadoff-Chu sequences) can be used concurrently within a cell. As another example, NR preamble format 0 (an NR preamble format based on a long Zadoff-Chu sequence) and NR preamble format B4 (an NR preamble format based on a short Zadoff-Chu sequence) can be used concurrently within a cell. As yet another example, NR preamble format C0 and NR preamble format C2 (both NR preamble formats based on short Zadoff-Chu sequences) can be used concurrently within a cell. These PRACH preamble formats are defined in 3GPP TS 38.211, which is publicly available, and which is incorporated by reference herein its entirety.

In an aspect, the present disclosure provides a technique for positioning-assisted PRU configuration and/or selection. msgA PRUs can be classified into multiple formats, which may be configured with different numbers of DMRS symbols and different sizes of PUSCH resources in the time and frequency domains.

Figure 10:
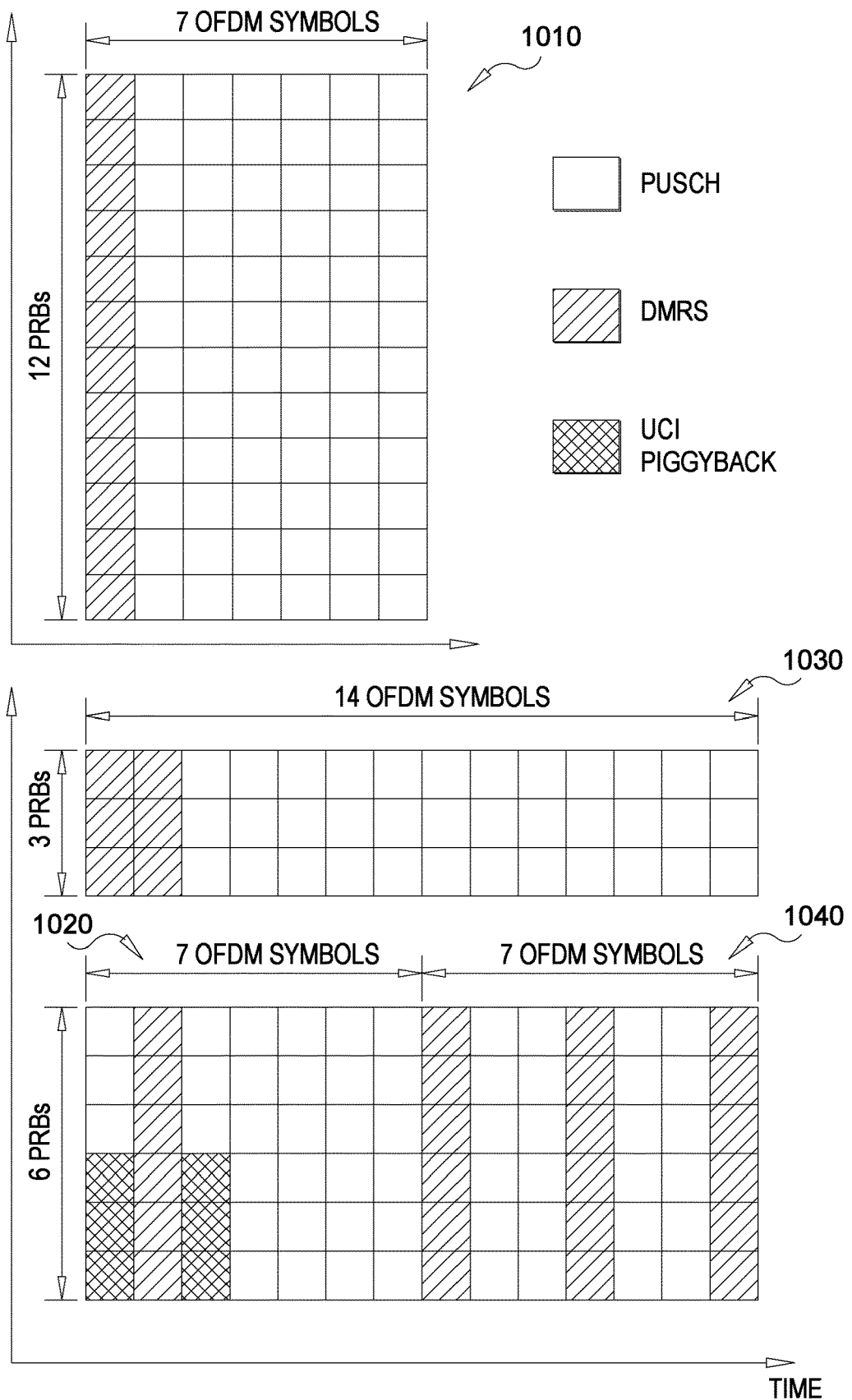
FIG. 10 illustrates different msgA PRU formats, according to aspects of the disclosure.

In an aspect, multiple msgA PRU formats can be configured and employed in the same cell. For example, as illustrated in FIG. 10, a first msgA PRU format 1010, spanning seven OFDM symbols in time and 12 PRBs in frequency, may comprise one DMRS symbol. A second msgA PRU format 1020, spanning seven symbols in time and six PRBs in frequency, may comprise one DMRS symbol. A third msgA PRU format 1030, spanning 14 symbols in time and three PRBs in frequency, may comprise two DMRS symbols. A fourth msgA PRU format 1040, spanning seven symbols in time and six PRBs in frequency, may comprise three DMRS symbols.

Figure 11:
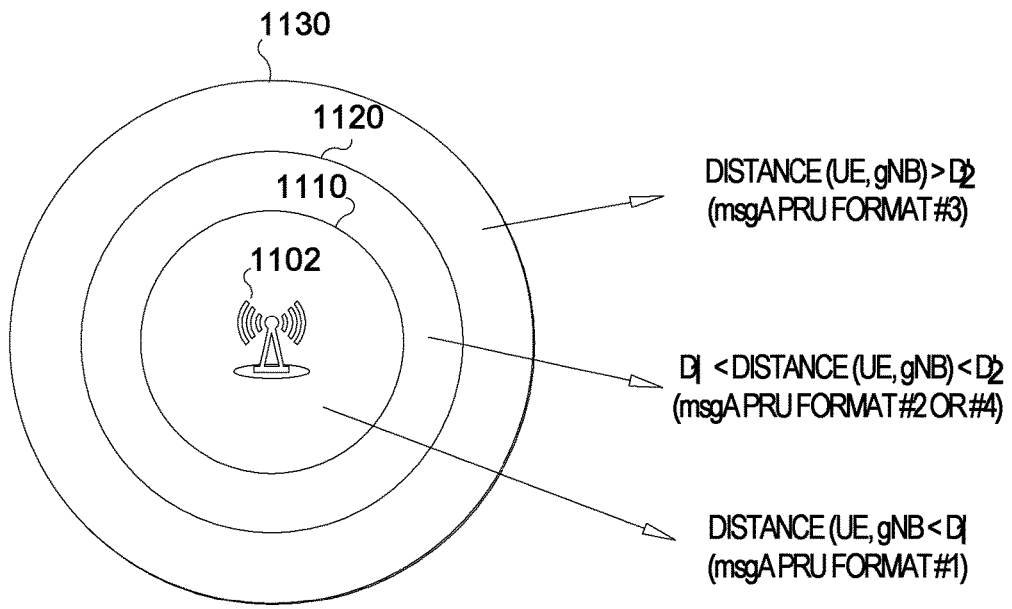
FIG. 11 illustrates different PRU formats for UEs in different cell ranges, according to aspects of the disclosure.

The network (e.g., the serving base station or a location server) may configure different PRU formats for UEs in different cell ranges. For example, as illustrated in FIG. 11, if the distance between a UE and a base station 1102 is less than a distance $D'_1$ (i.e., within cell range 1110), a first msgA PRU format 1010 in FIG. 10 can be used. If the distance between a UE and the base station 1102 is greater than the distance $D'_1$ and less than a distance $D'_2$ (i.e., in cell range 1120), then a second msgA PRU format 1020 in FIG. 10 may be used for low speed UEs, and a fourth msgA PRU format 1040 in FIG. 10 may be used for high speed UEs. If the distance between a UE and the base station 1102 is greater than the distance $D'_2$ (i.e., in cell range 1130), then a third msgA PRU format 1030 in FIG. 10 may be used.

For contention-based two-step random access, the UE obtains positioning information from multiple transmission points of the serving base station, or from the serving base station and neighboring cells, or from UE-centric machine learning and sidelink communications. As above, the positioning information can be derived from the time(s) of arrival of reference signals, RSTD measurement(s), RSRP measurements, and/or, for UEs in an RRC_CONNECTED or RRC_INACTIVE mode, from the latest timing advance parameter. Based on the network configuration (e.g., as received at 610 of FIG. 6) and the UE's knowledge of such positioning information, the UE can select an appropriate PRU format for msgA transmission.

Figure 12:
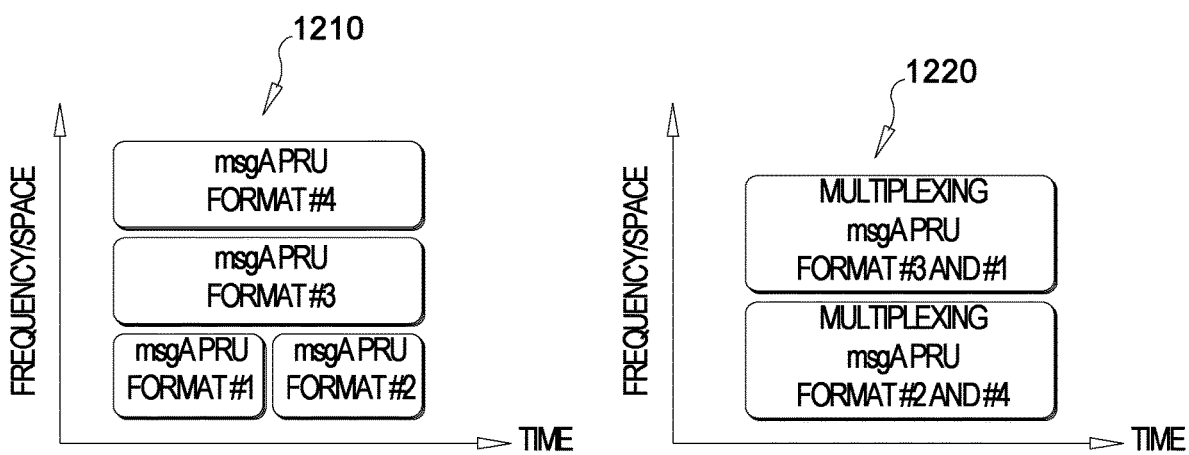
FIG. 12 illustrates different PRU formats multiplexed on the same PRU occasion, according to aspects of the disclosure.

For contention-free two-step random access, the base station can obtain positioning information for the UE based on DL/UL measurements in the serving cell or neighboring cells. The base station can coordinate the msgA PRU format assignments when scheduling msgA transmissions. Further, multiple UEs can be scheduled in the same two-step random access PUSCH occasion (PO). In addition, as illustrated in FIG. 12, different PRU formats can be multiplexed on the same PO (i.e., the same time/frequency resources), or assigned to different POs. For example, as illustrated by graph 1210, the first and second msgA PRU formats of FIG. 11 (i.e., formats "#1" and "#2") may occupy given time and frequency resources, and the third and fourth msgA PRU formats of FIG. 11 (i.e., formats "#3" and "#4") may occupy higher frequency and longer time resources than the first and second msgA PRU formats. Further, as illustrated by graph 1220, the first and third and second and fourth msgA PRU formats of FIG. 11 may be multiplexed over the time and frequency resources allocated for the first, second, and third msgA PRU formats in graph 1210.

In an aspect, joint configuration of both preamble and PRU formats can be supported, and a preamble format can be associated with one or multiple PRU formats.

Figure 13A:
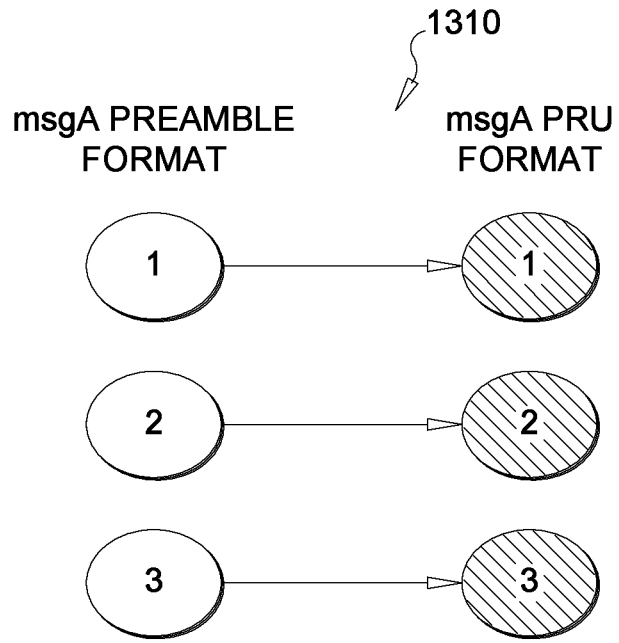
FIGS. 13A and 13B illustrate various associations between msgA preamble formats and PRU formats.
Figure 13B:
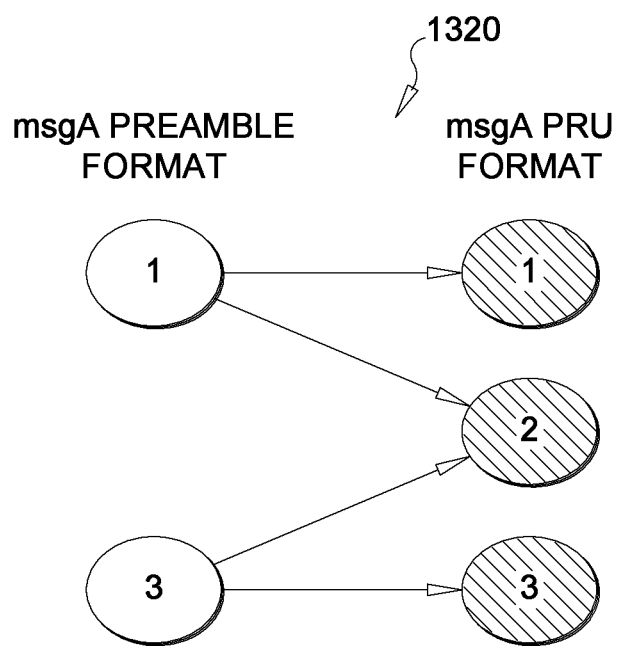

When one msgA preamble format is associated with multiple msgA PRU formats, preamble sequence partitioning or UCI-on-PUSCH can be used to identify the PRU format in use, as well as the modulation coding scheme (MCS)/transport block size (TBS) of the msgA payload. FIGS. 13A and 13B illustrate various associations between msgA preamble formats and PRU formats, according to aspects of the disclosure. Specifically, FIG. 13A illustrates a one-to-one mapping 1310 between the msgA preamble format and the PRU format, while FIG. 13B illustrates a hybrid mapping 1320 between msgA preamble formats and PRU formats. As shown in the hybrid mapping 1320, a first msgA preamble format maps to first and second msgA PRU formats, and a third msgA preamble format maps to second and third msgA PRU formats.

Figure 14:
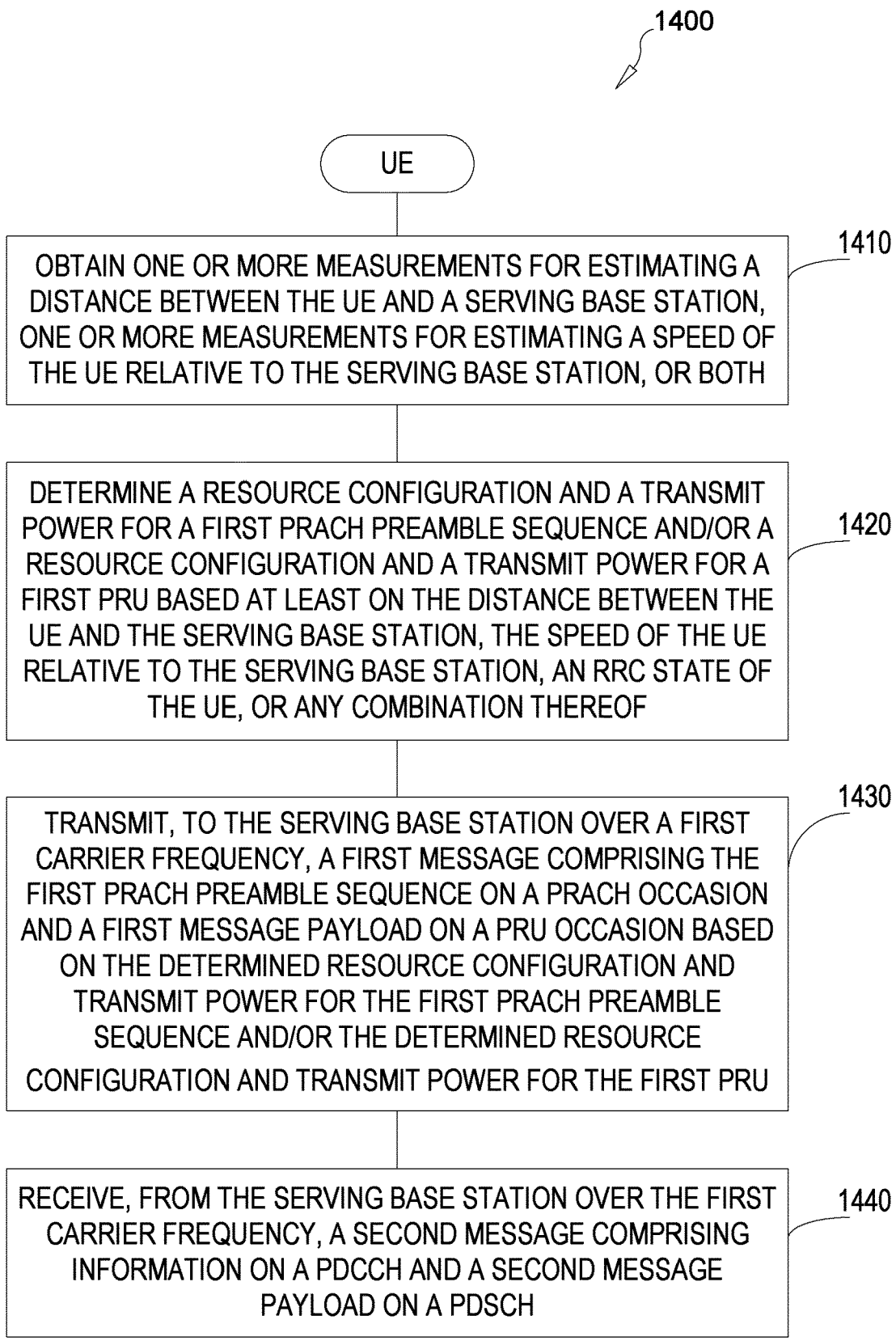
FIGS. 14 and 15 illustrate exemplary methods of wireless communication, according to aspects of the disclosure.

FIG. 14 illustrates an exemplary method 1400 of wireless communication. The method 1400 may be performed by a UE (e.g., any of the UEs described herein).

At 1410, the UE obtains (e.g., performs) one or more measurements for estimating a distance between the UE and a serving base station (e.g., any of the base stations described herein providing wireless connectivity to the UE), one or more measurements for estimating a speed of the UE relative to the serving base station (which may be the same or different measurements), or both. In an aspect, operation 1410 may be performed by WWAN transceiver 310, processing system 332, memory component 340, and/or random access module 342, any or all of which may be considered means for performing this operation.

At 1420, the UE determines a resource configuration and a transmit power for a first PRACH preamble sequence and/or a resource configuration and a transmit power for a first PRU based at least on the distance between the UE and the serving base station, the speed of the UE relative to the serving base station, an RRC state of the UE, or any combination thereof. In greater detail, the resource configuration options for the preamble (PRACH) and the PRU (PUSCH) are RRC parameters indicated by the base station, either in system information (SI) or via RRC signaling. Moreover, multiple types of resource configurations can be indicated by the network for each RRC state. On the UE side, the UE knows its RRC state. Therefore, the UE will select/determine an appropriate resource configuration for its preamble and payload, based on the UE's RRC state, positioning information, speed estimate, and other criteria applicable to random access procedure. In an aspect, operation 1430 may be performed by WWAN transceiver 310, processing system 332, memory component 340, and/or random access module 342, any or all of which may be considered means for performing this operation.

At 1430, the UE transmits, to the serving base station over a first carrier frequency, a first message comprising the first PRACH preamble sequence on a first PRACH occasion and a first message payload on a first PRU occasion, as at 630 and 640 of FIG. 6, based on the determined resource configuration and the transmit power for the first PRACH preamble sequence and/or the determined resource configuration and the transmit power for the first PRU. In an aspect, operation 1440 may be performed by WWAN transceiver 310, processing system 332, memory component 340, and/or random access module 342, any or all of which may be considered means for performing this operation.

At 1440, the UE receives, from the serving base station over the first carrier frequency, a second message comprising information on a PDCCH and a second message payload on a PDSCH, as at 670 and 680 of FIG. 6. In an aspect, the PDCCH or the PDSCH may have a QCL relationship with a beam index of an SSB or an RS associated with the first message, and the first message may be the first step of a two-step contention-based random access procedure. In an aspect, operation 1450 may be performed by WWAN transceiver 310, processing system 332, memory component 340, and/or random access module 342, any or all of which may be considered means for performing this operation.

Figure 15:
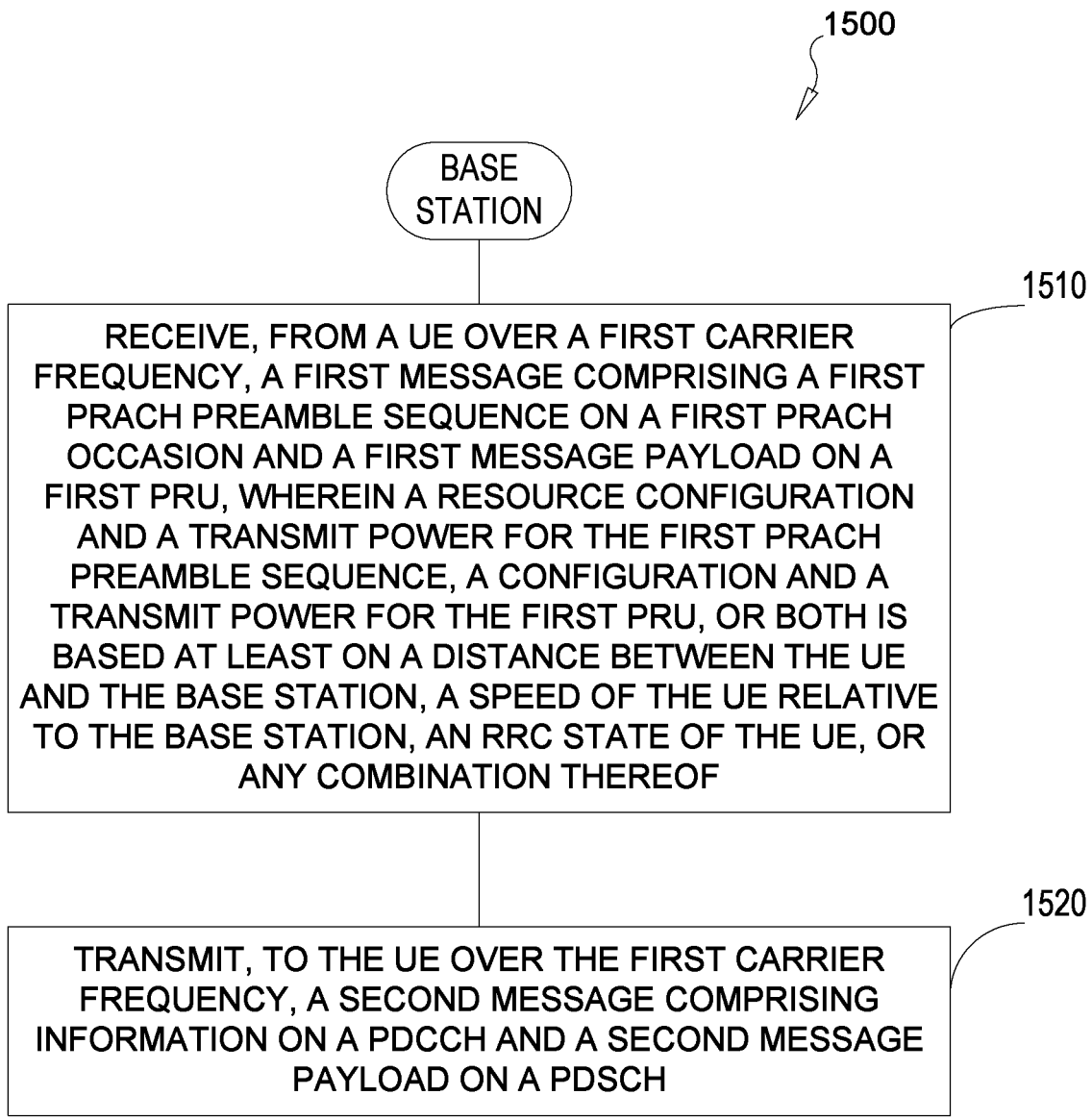

FIG. 15 illustrates an exemplary method 1500 of wireless communication. The method 1500 may be performed by a base station (e.g., any of the base stations described herein).

At 1510, the base station receives, from a UE (e.g., any of the UEs described herein) over a first carrier frequency, a first message comprising a first PRACH preamble sequence on a first PRACH occasion and a first message payload on a first PRU, as at 630 and 640 of FIG. 6. In an aspect, a resource configuration and a transmit power of the first PRACH preamble sequence, a resource configuration and a transmit power of the first PRU, or both is based at least on a distance between the UE and the base station, a speed of the UE relative to the base station, an RRC state of the UE, or any combination thereof. In an aspect, operation 1510 may be performed by WWAN transceiver 350, processing system 384, memory component 386, and/or random access module 388, any or all of which may be considered means for performing this operation.

At 1520, the base station transmits, to the UE over the first carrier frequency, a second message comprising information on a PDCCH and a second message payload on a PDSCH, as at 670 and 680 of FIG. 6. In an aspect, the PDCCH or the PDSCH may have a QCL relationship with a beam index of an SSB or an RS associated with the first message, and the first message may be the first step of a two-step contention-based random access procedure. In an aspect, operation 1520 may be performed by WWAN transceiver 350, processing system 384, memory component 386, and/or random access module 388, any or all of which may be considered means for performing this operation.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a computer-readable medium embodying methods for wireless communications, as disclosed herein.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communication performed by a user equipment (UE), comprising:
    obtaining one or more measurements for estimating a distance between the UE and a serving base station, one or more measurements for estimating a speed of the UE relative to the serving base station, or both;
    determining a resource configuration and a transmit power for a first physical random access channel (PRACH) preamble sequence and/or a resource configuration and a transmit power for a first physical uplink shared channel (PUSCH) resource unit (PRU) based at least on the distance between the UE and the serving base station, the speed of the UE relative to the serving base station, a radio resource control (RRC) state of the UE, or any combination thereof;
    transmitting, to the serving base station over a first carrier frequency, a first message comprising the first PRACH preamble sequence on a PRACH occasion and a first message payload on a PRU occasion based on the determined resource configuration and transmit power for the first PRACH preamble sequence and/or the determined resource configuration and transmit power for the first PRU; and
    receiving, from the serving base station over the first carrier frequency, a second message comprising information on a physical downlink control channel (PDCCH) and a second message payload on a physical downlink shared channel (PDSCH),
    wherein the PDCCH or the PDSCH have a quasi co-location relationship with a beam index of a synchronization signal block (SSB) or a reference signal (RS) associated with the first message, and
    wherein the first message is a first step of a two-step contention-based random access procedure.

2. The method of claim 1, wherein:
the resource configuration and the transmit power of the first PRACH preamble sequence, the resource configuration and the transmit power of the first PRU, or both is determined by the UE, and
the method further comprises:
estimating the distance between the UE and the serving base station based on the one or more measurements for estimating the distance;
estimating the speed of the UE relative to the serving base station based on the one or more measurements for estimating the speed; or
estimating the distance between the UE and the serving base station based on the one or more measurements for estimating the distance and estimating the speed of the UE relative to the serving base station based on the one or more measurements for estimating the speed.

3. The method of claim 2, wherein the estimating the speed of the UE comprises:
estimating relative movement between the UE and the serving base station.

4. The method of claim 2, further comprising:
receiving, from the serving base station, RRC signaling, a system information block (SIB), the SSB, and the RS, wherein the resource configuration for the first message in a first step of a two-step contention-based random access procedure is associated at least with a beam index of the SSB or a beam index of the RS of the serving base station.

5. The method of claim 4, wherein the resource configuration and the transmit power of the first PRACH preamble sequence is determined based on the estimated distance, the estimated speed, or both, and information associated with the RRC signaling, the SIB, the SSB, and the RS, and/or wherein the resource configuration and the transmit power of the first PRU is determined based on the estimated distance, the estimated speed, or both, and information associated with the RRC signaling, the SIB, the beam index of the SSB, and the beam index of the RS.

6. The method of claim 2, wherein the estimating the speed comprises:
estimating variations of the distance between the UE and the serving base station and arrival-path-angles of reference signals received at the UE from the serving base station,
estimating variations of the distance between the UE and the serving base station and arrival-path-angles of reference signals received at the UE from neighbor base stations,
estimating variations of the distance between the UE and the serving base station and arrival-path-angles of reference signals received at the UE from multiple transmission points of the serving base station, or
any combination thereof, based on a selected SSB or RS beam of the serving base station.

7. The method of claim 1, wherein:
the method further comprises selecting an SSB or RS beam transmitted from the serving base station,
the PRU occasion is associated with a beam index of the selected SSB or RS beam,
determining the resource configuration and the transmit power for the first PRACH preamble sequence and/or the resource configuration and the transmit power for the PRU occasion comprises receiving, from the serving base station, an identification of an RRC state dependent configuration for the first PRACH preamble sequence and/or an identification of an RRC state dependent configuration for the PRU occasion, and
the distance between the UE and the serving base station, the speed of the UE relative to the serving base station, or both are determined by the serving base station processing the one or more measurements for estimating the distance, the one or more measurements for estimating the speed, or both, or decoding uplink reports from the UE associated with the distance, the speed, or both.

8. The method of claim 1, wherein an RRC state dependent configuration for the first PRACH preamble sequence specifies a first base sequence length, a first root index set, a first tone spacing, a first cyclic prefix (CP) length, a first cyclic shift size, a first time-frequency resource allocation, a first PRACH preamble format, the first PRACH occasion, or any combination thereof.

9. The method of claim 8, wherein the first base sequence length is one of a plurality of base sequence lengths, the first root index set is one of a plurality of root index sets, the first tone spacing is one of a plurality of tone spacings, the first CP length is one of a plurality of CP lengths, the first cyclic shift size is one of a plurality of cyclic shift sizes, the first time-frequency resource allocation is one of a plurality of time-frequency resource allocations, the first PRACH preamble format is one of a plurality of PRACH preamble formats, and the first PRACH occasion is one of a plurality of PRACH occasions used for PRACH preamble sequences transmitted on the first carrier frequency.

10. The method of claim 8, wherein the first PRACH preamble sequence comprises a concatenation of two or more base PRACH preamble sequences with identical or different numbers of repetitions for each base PRACH preamble sequence.

11. The method of claim 1, wherein the first PRACH preamble sequence comprises a Zadoff-Chu sequence having a prime length, with or without cyclic extension.

12. The method of claim 1, further comprising:
detecting a plurality of transmit beams on the first carrier frequency; and
transmitting, to the serving base station over the first carrier frequency, a plurality of messages each comprising a PRACH preamble sequence and a message payload, the plurality of messages including the first message.

13. The method of claim 12, wherein the PRACH preamble sequence is mapped to a resource configuration and transport format of the first message payload.

14. The method of claim 12, further comprising:
multiplexing a plurality of PRACH preamble sequences of the plurality of messages having different configurations onto a same PRACH occasion.

15. The method of claim 12, further comprising:
assigning each PRACH preamble sequence of the plurality of messages having different configurations to different PRACH occasions.

16. A method of wireless communication performed by a base station, comprising:
receiving, from a user equipment (UE) over a first carrier frequency, a first message comprising a first physical random access channel (PRACH) preamble sequence on a first PRACH occasion and a first message payload on a first physical uplink shared channel (PUSCH) resource unit (PRU), wherein a resource configuration and a transmit power for the first PRACH preamble sequence, a configuration and a transmit power for the first PRU, or both is based at least on a distance between the UE and the base station, a speed of the UE relative to the base station, a radio resource control (RRC) state of the UE, or any combination thereof; and transmitting, to the UE over the first carrier frequency, a second message comprising information on a physical downlink control channel (PDCCH) and a second message payload on a physical downlink shared channel (PDSCH), wherein the PDCCH or PDSCH have a quasi co-location relationship with a beam index of a synchronization signal block (SSB) or a reference signal (RS) associated with the first message, and wherein the first message is a first step of a two-step contention-based random access procedure.

17. The method of claim 16, wherein:

the UE estimates the distance between the UE and the base station, the speed of the UE relative to the base station, or both, and the UE determines the resource configuration and the transmit power for the first PRACH preamble sequence, the resource configuration and the transmit power for the first PRU, or both, based on the beam index of the SSB or the RS.

18. The method of claim 16, the method further comprising:

receiving, from the UE, one or more measurements for estimating the distance between the UE and the base station, one or more measurements for estimating the speed of the UE relative to the base station, or both; and processing the one or more measurements for estimating the distance, the one or more measurements for estimating the speed, or both, or decoding uplink reports on the distance, the speed, or both, to determine the distance between the UE and the base station, the speed of the UE relative to the base station, or both.

19. The method of claim 18, further comprising:

determining the resource configuration and the transmit power for the first PRACH preamble sequence based on the estimated distance, the estimated speed, or both;

determining the configuration of the first PRU based on the estimated distance, the estimated speed, or both; and transmitting, to the UE, an identification of an RRC state dependent configuration for the first PRACH preamble sequence and/or an identification of an RRC state dependent configuration for the first PRU.

20. The method of claim 16, wherein the resource configuration and the transmit power for the first PRACH preamble sequence specifies a first base sequence length, a first root index set, a first tone spacing, a first cyclic prefix (CP) length, a first cyclic shift size, a first time-frequency resource allocation, a first PRACH preamble format, the first PRACH occasion, or any combination thereof.

21. The method of claim 20, wherein the first base sequence length is one of a plurality of base sequence lengths, the first root index set is one of a plurality of root index sets, the first tone spacing is one of a plurality of tone spacings, the first CP length is one of a plurality of CP lengths, and the first cyclic shift size is one of a plurality of cyclic shift sizes, the first time-frequency resource allocation is one of a plurality of time-frequency resource allocations, the first PRACH preamble format is one of a plurality of PRACH preamble formats, and the first PRACH occasion is one of a plurality of PRACH occasions used for PRACH preamble sequences transmitted on the first carrier frequency.

22. The method of claim 21, wherein different ones of the plurality of base sequence lengths, the plurality of root index sets, the plurality of tone spacings, the plurality of CP lengths, the plurality of cyclic shift sizes, or any combination thereof are used for PRACH preamble sequences transmitted on the first carrier frequency based on different distances of UEs from the base station, different speeds of the UEs, or both.

23. The method of claim 20, wherein the first PRACH preamble sequence comprises a concatenation of two or more base PRACH preamble sequences, with identical or different numbers of repetitions for each PRACH preamble sequence.

24. The method of claim 16, wherein the first PRACH preamble sequence comprises a Zadoff-Chu sequence having a prime length, with or without cyclic extension.

25. A user equipment (UE), comprising:

a memory;

at least one transceiver; and at least one processor communicatively coupled to the memory and the at least one transceiver, the at least one processor configured to:

obtain one or more measurements for estimating a distance between the UE and a serving base station, one or more measurements for estimating a speed of the UE relative to the serving base station, or both;

determine a resource configuration and a transmit power for a first physical random access channel (PRACH) preamble sequence and/or a resource configuration and a transmit power for a first physical uplink shared channel (PUSCH) resource unit (PRU) based at least on the distance between the UE and the serving base station, the speed of the UE relative to the serving base station, a radio resource control (RRC) state of the UE, or any combination thereof;

using the at least one transceiver to transmit, to the serving base station over a first carrier frequency, a first message comprising the first PRACH preamble sequence on a first PRACH occasion and a first message payload on a PRU occasion based on the resource configuration associated with a beam index of SSB or RS, and the transmit power for the first PRACH preamble sequence and/or the resource configuration and the transmit power for the first PRU; and receive, from the serving base station over the first carrier frequency via the at least one transceiver, a second message comprising information on a physical downlink control channel (PDCCH) and a second message payload on a physical downlink shared channel (PDSCH), wherein the PDCCH or the PDSCH have a quasi co-location relationship with a beam index of a synchronization signal block (SSB) or a reference signal (RS) associated with the first message, and wherein the first message is a first step of a two-step contention-based random access procedure.

26. The UE of claim 25, wherein:

an RRC state dependent configuration of the first PRACH preamble sequence is determined based on the estimated distance, the estimated speed, or both, and information associated with the RRC signaling, the SIB, the SSB beam index, and the at least one RS beam index, and an RRC state dependent configuration of the first PRU is determined based on the estimated distance, the estimated speed, or both, and information associated with the RRC signaling, the SIB, the SSB beam index, and the at least one RS beam index.

27. The UE of claim 25, wherein:
the at least one processor is further configured to select an SSB or RS beam transmitted from the serving base station,
the PRU occasion is associated with a beam index of the selected SSB or RS beam,
determining the resource configuration and the transmit power for the first PRACH preamble sequence and/or the resource configuration and the transmit power for the first PRU comprises receiving, from the serving base station, an identification of the RRC state dependent configuration for the first PRACH preamble sequence and/or an identification of the RRC state dependent configuration for the first PRU, and
the distance between the UE and the serving base station, the speed of the UE relative to the serving base station, or both are determined by the serving base station processing the one or more measurements for estimating the distance, the one or more measurements for estimating the speed, or both, or decoding uplink reports from the UE associated with the distance, the speed, or both.

28. A base station, comprising:
a memory;
at least one transceiver; and
at least one processor communicatively coupled to the memory and the at least one transceiver, the at least one processor configured to:
receive, from a user equipment (UE) over a first carrier frequency via the at least one transceiver, a first message comprising a first physical random access channel (PRACH) preamble sequence on a first PRACH occasion and a first message payload on a first physical uplink shared channel (PUSCH) resource unit (PRU), wherein a resource configuration and a transmit power for the first PRACH preamble sequence, a configuration and a transmit power for the first PRU, or both is based on a distance between the UE and the base station, a speed of the UE relative to the base station, a radio resource control (RRC) state of the UE, or any combination thereof; and
using the at least one transceiver to transmit, to the UE over the first carrier frequency, a second message comprising information on a physical downlink control channel (PDCCH) and a second message payload on a physical downlink shared channel (PDSCH),
wherein the PDCCH or the PDSCH have a quasi co-location relationship with a beam index of a synchronization signal block (SSB) or a reference signal (RS) associated with the first message, and
wherein the first message is a first step of a two-step contention-based random access procedure.

29. The base station of claim 28, wherein the resource configuration and the transmit power for the first PRACH preamble sequence specifies a first base sequence length, a first root index set, a first tone spacing, a first cyclic prefix (CP) length, a first cyclic shift size, a first time-frequency resource allocation, a first PRACH preamble format, the first PRACH occasion, or any combination thereof.

30. The base station of claim 29, wherein the first base sequence length is one of a plurality of base sequence lengths, the first root index set is one of a plurality of root index sets, the first tone spacing is one of a plurality of tone spacings, the first CP length is one of a plurality of CP lengths, and the first cyclic shift size is one of a plurality of cyclic shift sizes, the first time-frequency resource allocation is one of a plurality of time-frequency resource allocations, the first PRACH preamble format is one of a plurality of PRACH preamble formats, and the first PRACH occasion is one of a plurality of PRACH occasions used for PRACH preamble sequences transmitted on the first carrier frequency.

* * * * *